US012168248B2

(12) United States Patent
Jiang et al.

(10) Patent No.: US 12,168,248 B2
(45) Date of Patent: Dec. 17, 2024

(54) WIPING OBJECT CLEANING DEVICE FOR FLOOR MOPPING MACHINE

(71) Applicant: FORT PLASTIC & METALWORK (JIAXING) CO., LTD, Jiaxing (CN)

(72) Inventors: Tao Jiang, Jiaxing (CN); Xuan Li, Jiaxing (CN); Jing Li, Jiaxing (CN); Hao Chen, Jiaxing (CN); Hongwei Liu, Jiaxing (CN); Yongjian Zhang, Jiaxing (CN); Bin Wu, Jiaxing (CN)

(73) Assignee: FORT PLASTIC & METALWORK (JIAXING) CO., LTD, Jiaxing (CN)

(*) Notice: Subject to any disclaimer, the term of this patent is extended or adjusted under 35 U.S.C. 154(b) by 309 days.

(21) Appl. No.: 17/771,024

(22) PCT Filed: Oct. 22, 2020

(86) PCT No.: PCT/CN2020/122799
§ 371 (c)(1),
(2) Date: Apr. 22, 2022

(87) PCT Pub. No.: WO2021/078193
PCT Pub. Date: Apr. 29, 2021

(65) Prior Publication Data

US 2022/0410220 A1 Dec. 29, 2022

(30) Foreign Application Priority Data

Oct. 22, 2019 (CN) ......................... 201911005431.6
Dec. 27, 2019 (CN) ......................... 201922450583.9
(Continued)

(51) Int. Cl.
*B08B 1/32* (2024.01)
*A47L 11/282* (2006.01)
(Continued)

(52) U.S. Cl.
CPC .............. *B08B 1/32* (2024.01); *A47L 11/282* (2013.01); *A47L 11/4038* (2013.01);
(Continued)

(58) Field of Classification Search
CPC ...... A47L 13/256; A47L 13/58; A47L 13/258; A47L 11/282; A47L 11/4038;
(Continued)

(56) References Cited

U.S. PATENT DOCUMENTS

2007/0113418 A1 5/2007 Palmer

FOREIGN PATENT DOCUMENTS

CN 108125642 A * 6/2018 ............. A47L 13/59
CN 207785091 U 8/2018
(Continued)

*Primary Examiner* — Katina N. Henson
(74) *Attorney, Agent, or Firm* — Bayramoglu Law Offices LLC

(57) ABSTRACT

A wiping object cleaning device for a floor mopping machine belongs to the technical field of cleaning appliances. The wiping object cleaning device includes a bucket body, and further includes a water conveying mechanism for conveying water to a wiping object of a floor mopping machine. The water conveying mechanism conveys water during cleaning, and stops conveying water during water removal. The wiping object cleaning device is able to clean a mop of a floor mopping machine efficiently, wide in application range, suitable for different wiping objects of floor mopping machines, and low in production cost.

15 Claims, 19 Drawing Sheets

(30) Foreign Application Priority Data

| | | |
|---|---|---|
| Dec. 27, 2019 | (CN) | 201922450674.2 |
| Mar. 17, 2020 | (CN) | 202020329619.8 |
| Mar. 17, 2020 | (CN) | 202020338013.0 |
| Jun. 8, 2020 | (CN) | 202021038081.1 |
| Jun. 8, 2020 | (CN) | 202021040680.7 |

(51) Int. Cl.
*A47L 11/40* (2006.01)
*B08B 1/12* (2024.01)
*B08B 13/00* (2006.01)

(52) U.S. Cl.
CPC ............ *A47L 11/4091* (2013.01); *B08B 1/12* (2024.01); *B08B 13/00* (2013.01)

(58) Field of Classification Search
CPC ......... A47L 11/4091; B08B 1/32; B08B 1/12; B08B 13/00
USPC .............................................................. 15/38
See application file for complete search history.

(56) References Cited

FOREIGN PATENT DOCUMENTS

| | | | |
|---|---|---|---|
| CN | 108852212 | A | 11/2018 |
| CN | 109515394 | A | 3/2019 |
| CN | 209269607 | U | 8/2019 |
| WO | 2019056997 | A1 | 3/2019 |

* cited by examiner

WIPING OBJECT CLEANING DEVICE FOR FLOOR MOPPING MACHINE

CROSS REFERENCE TO THE RELATED APPLICATIONS

This application is the national phase entry of International Application No. PCT/CN2020/122799, filed on Oct. 22, 2020, which is based upon and claims priority to Chinese Patent Applications No. 201911005431.6, filed on Oct. 22, 2019 No. 201922450583.9, filed on Dec. 27, 2019; No. 201922450674.2, filed on Dec. 27, 2019; No. 202020329619.8, filed on Mar. 17, 2020; No. 202020338013.0, filed on Mar. 17, 2020; No. 202021040680.7, filed on Jun. 8, 2020; and No. 202021038081.1, filed on Jun. 8, 2020; the entire contents of which are incorporated herein by reference.

TECHNICAL FIELD

The invention belongs to the technical field of cleaning appliances, and particularly relates to a wiping object cleaning device for a floor mopping machine.

BACKGROUND

The floor mopping machine, as an existing electrical cleaning appliance, typically comprises a motor and a wiping object driven by the motor. During cleaning, the wiping object is driven by the motor to rotate or reciprocate horizontally to wipe the floor. Although the floor mopping machine saves wiping labor for users, the wiping object has to be cleaned separately after being dismantled due to the lack of a measure for cleaning the wiping object, which makes operation inconvenient and makes cleaning not sanitary enough.

SUMMARY

The objective of the invention is to solve the above-mentioned problems by providing a wiping object cleaning device for a floor mopping machine.

To fulfill the above objective, the invention adopts the following technical solution:

A wiping object cleaning device for a floor mopping machine comprises a bucket body, and further comprises a water conveying mechanism for conveying water to a wiping object of a floor mopping machine;

During cleaning, the water conveying mechanism conveys water; and

During water removal, the water conveying mechanism stops conveying water.

According to the wiping object cleaning device for a floor mopping machine, the water conveying mechanism may, but not limited to, convey water to the wiping object of the floor mopping machine in the bucket body directly or indirectly. For example, the water conveying mechanism conveys water to the wiping object through a water removal member. A water removal member and a driving mechanism for driving the water removal member to rotate with respect to the bucket body are disposed in the bucket body.

According to the wiping object cleaning device for a floor mopping machine, the bucket body comprises a cleaning cavity, the water removal member is disposed in the cleaning cavity, and the water conveying mechanism conveys water into the cleaning cavity.

According to the wiping object cleaning device for a floor mopping machine, the water removal member is any one or a combination of a strip, a brush and a roller.

According to the wiping object cleaning device for a floor mopping machine, the water conveying mechanism comprises a water tank, the water tank is connected to a washing pipe, the washing pipe has an end connected to the water tank and an end stretching into the cleaning cavity, and a water outlet of the washing pipe is lower than the water tank.

According to the wiping object cleaning device for a floor mopping machine, a valve is disposed in the washing pipe.

According to the wiping object cleaning device for a floor mopping machine, the water outlet of the washing pipe is located above the water removal member.

According to the wiping object cleaning device for a floor mopping machine, the driving mechanism comprises a rotary pedal disposed on the bucket body, and the rotary pedal is in drive fit with the water removal member through a gear.

According to the wiping object cleaning device for a floor mopping machine, the water conveying mechanism comprises a water pump disposed in the bucket body, a washing plate is disposed in the bucket body, and the water pump has an end contacting with a water surface and an end connected to the washing plate.

According to the wiping object cleaning device for a floor mopping machine, a plurality of discharge grooves are formed in the washing plate and correspond to the water removal member in position.

According to the wiping object cleaning device for a floor mopping machine, a plurality of water outlets are formed in the washing plate and correspond to the discharge grooves in position.

Compared with the prior art, the invention has the following advantages:

1. The wiping object cleaning device is able to clean wiping objects of floor mopping machines efficiently, wide in application range, suitable for different wiping objects of floor mopping machines, and low in production cost.
2. The rotary water removal member is used to clean and wipe wiping objects of floor mopping machines in all direction and at multiple angles, so that comprehensive cleaning is realized, and the dirt removal effect is good.

Other advantages, objectives and features of the invention will be partially reflected in the following description, and partially be understood by those skilled in the art in study and practice of the invention.

DETAILED DESCRIPTION OF THE EMBODIMENTS

Embodiment 1

As shown in FIG. 1, FIG. 2, FIG. 3 and FIG. 4, a wiping object cleaning device for a floor mopping machine comprises a bucket body 1, and further comprises a water conveying mechanism b4 for conveying water to a wiping object of a floor mopping machine in the bucket body 1, wherein a water removal member 4 and a driving mechanism b3 for driving the water removal member 4 to rotate with respect to the bucket body 1 are disposed in the bucket body 1.

In this embodiment, the water conveying mechanism b4 conveys water to the wiping object of the floor mopping machine directly or indirectly. For example, the water conveying mechanism b4 conveys water to the wiping object of the floor mopping machine through the water removal member 4. When to be cleaned, the wiping object is placed in the bucket body 1 and contacts with the water removal member 4, at this moment, the water conveying mechanism b4 conveys clean water into the bucket body 1 to wash the wiping object of the floor mopping machine, and in this case, the water conveying mechanism b4 is a water tank b8. The water removal member 4 is driven by the driving mechanism b3 to rotate to rub against the wiping object to remove dirt from the wiping object; and after the wiping object is cleaned, the conveying mechanism b4 stops conveying water, at this moment, the water removal member 4 is driven by the driving mechanism b3 to rotate again to remove water on the wiping object. The wiping object cleaning device is high in cleaning efficiency, wide in application range, suitable for different wiping objects of floor mopping machines, and low in production cost. When the wiping object cleaning device is used to clean a reciprocating wiping object of the floor mopping machine, the reciprocating wiping object of the floor mopping machine contacts with the water removal member 4, the water conveying mechanism b4 conveys water to the wiping object, and preferably, when the water removal member 4 is rotated, the wiping object reciprocates synchronously to be cleaned; and after the wiping object is cleaned, the water conveying mechanism b4 stops conveying water, and water on the wiping object is removed through the water removal member 4. When the wiping object cleaning device is used to clean a rotatable wiping object of the floor mopping machine, the rotatable wiping object of the floor mopping machine contacts with the water removal member 4, the water conveying mechanism b4 conveys water to the wiping object, and when the water removal member 4 is rotated, the wiping object rotates synchronously to be cleaned; and after the wiping object is cleaned, the water conveying mechanism b4 stops conveying water, and water on the wiping object is removed through the water removal member 4. An optimal cleaning or water removal effect will be realized through the cooperation of a rotatable mop head of the floor mopping machine and the water removal member 4.

Figure 1:
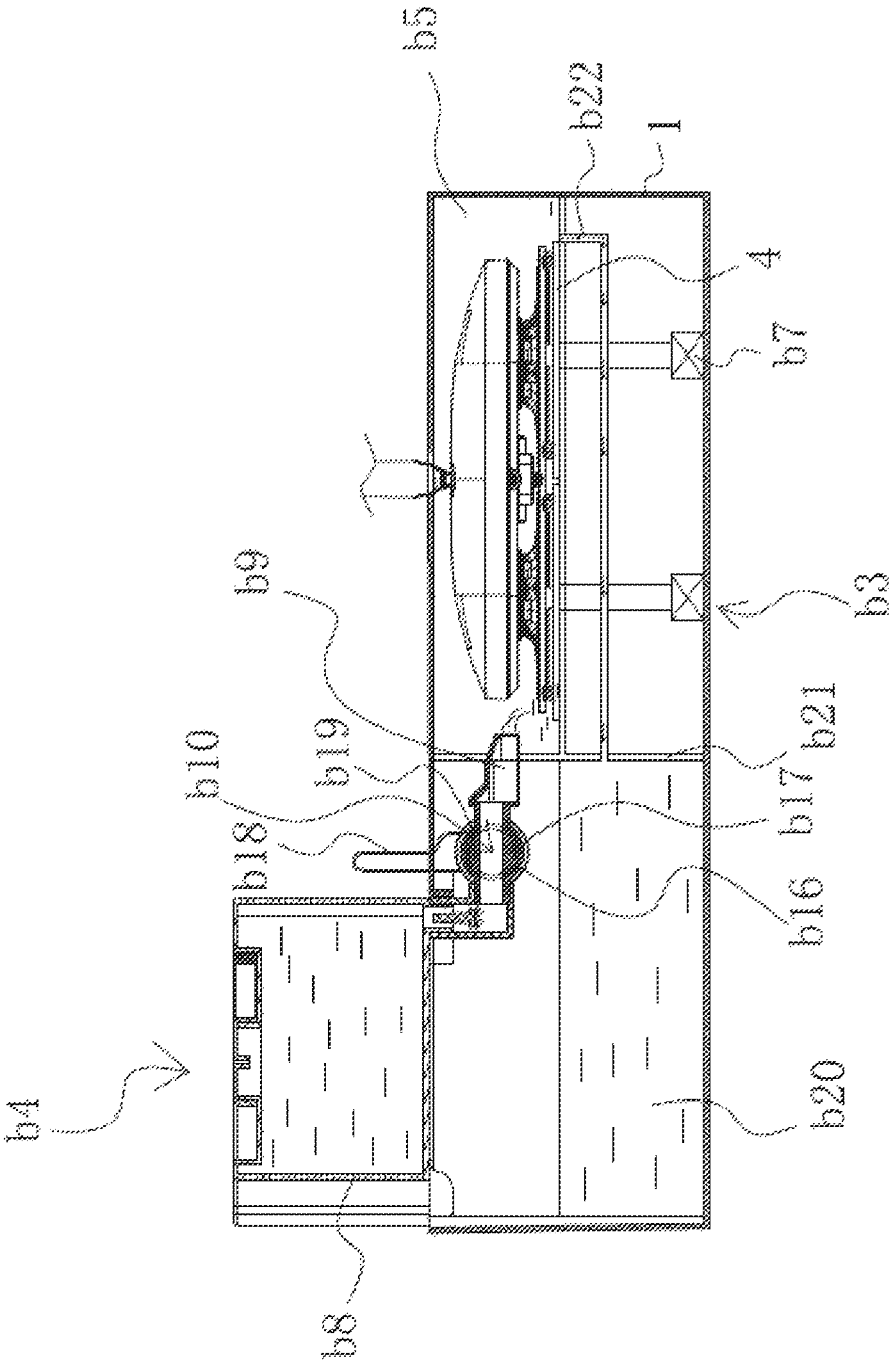
FIG. 1 is a schematic diagram of Embodiment 1 in a discharge state.
Figure 2:
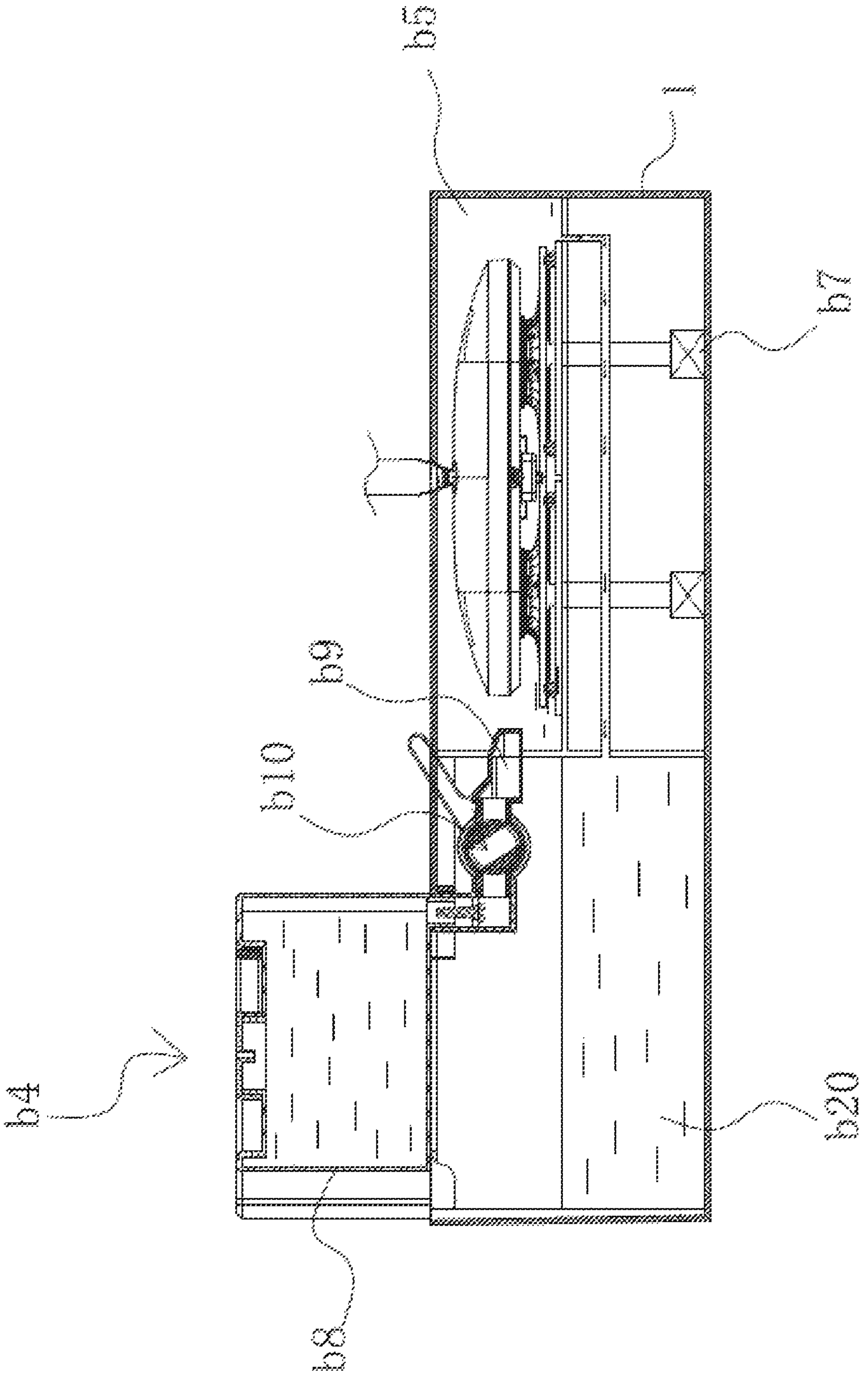
FIG. 2 is a schematic diagram of Embodiment 1 in a wiping state.

As shown in FIG. 1 and FIG. 2, the bucket body 1 comprises a cleaning cavity b5, the water removal member 4 is disposed in the cleaning cavity b5, and the water conveying mechanism b4 conveys water into the cleaning cavity b5.

As shown in FIG. 1, the water removal member 4 is any one or a combination of a strip, a brush and a roller, the driving mechanism b3 comprises a circumferential drive b7, and a rotating shaft of the circumferential drive b7 is fixedly connected to the water removal member 4. The driving mechanism b3 may be the circumferential drive b7 with the rotating shaft being connected to the water removal member 4, and those skilled in the art should understand that the circumferential drive b7 may be a motor or a rotary cylinder.

As shown in FIG. 1 and FIG. 2, the water conveying mechanism b4 comprises a water tank b8, the water tank b8 is connected to a washing pipe b9, one end of the washing pipe b9 is connected to the water tank b8, the other end of the washing pipe b9 extends into the cleaning cavity b5, and a water outlet of the washing pipe b9 is lower than the water tank b8.

In this embodiment, during cleaning, the wiping object is placed in the cleaning cavity b5; when water needs to be conveyed into the cleaning cavity b5, clean water in the water tank b8 flows into the cleaning cavity b5 through the washing pipe b9, so as to clean the wiping object.

Figure 3:
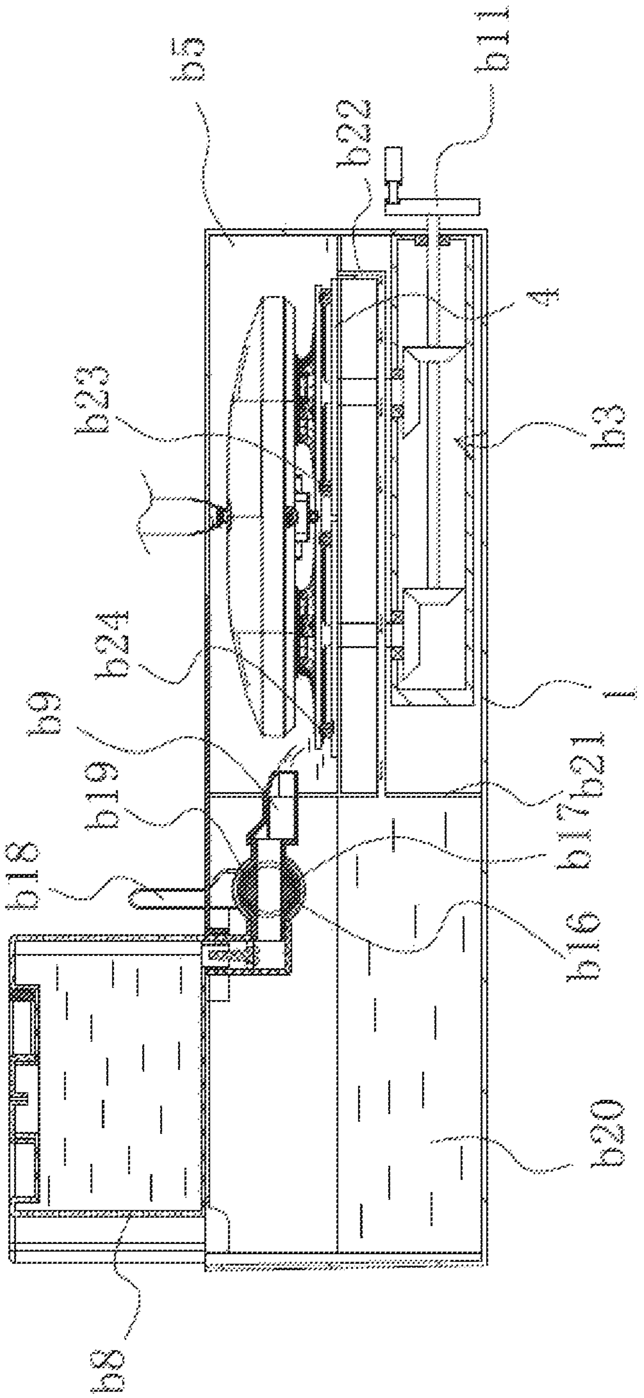
FIG. 3 is a schematic diagram of Embodiment 2 in a discharge state.
Figure 4:
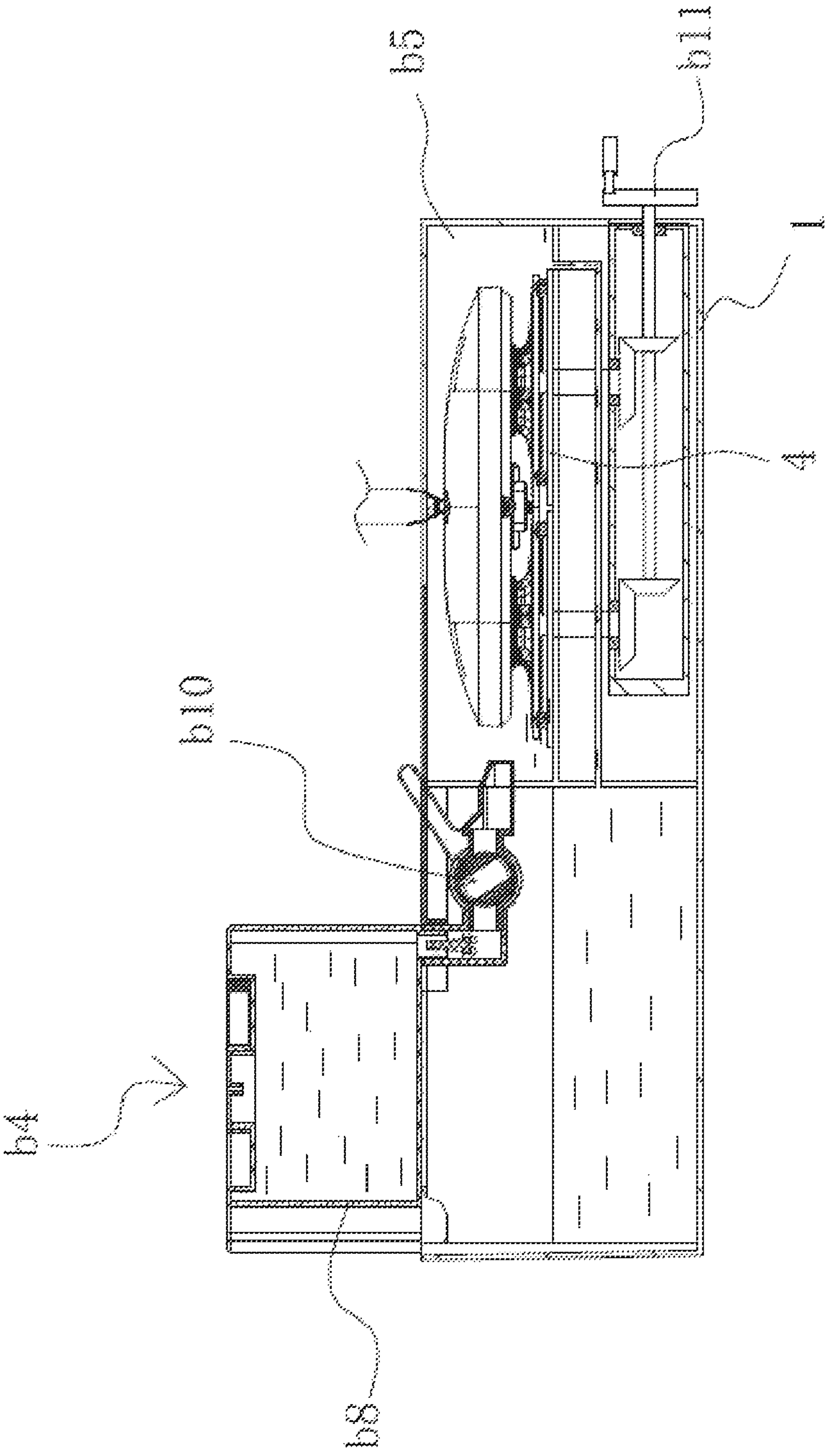
FIG. 4 is a schematic diagram of Embodiment 2 in a wiping state.

As shown in FIG. 3 and FIG. 4, a valve b10 is disposed in the washing pipe b9.

Specifically, the valve b10 comprises a pipe valve b16, a valve trim b17 is disposed in the pipe valve b16, a lever b18 is rotatably disposed on the pipe valve b16, a sealing ring b19 is disposed between the valve trim b16 and the lever b18, clean water is discharged out of or blocked in the water tank b8 through the pipe valve 16, a water hole is formed in the valve trim b17, and the lever b18 is able to drive the valve trim b17 to rotate to enable the water hole to be communicated or staggered with the washing pipe b9, so that clean water is discharged out of or blocked in the water tank b8; and the sealing ring b19 has a sealing effect and can prevent clean water from leaking when the water hole is staggered with the washing pipe b9.

The water outlet of the washing pipe b9 is located above the water removal member 4, a dirty water cavity b20 is formed in the bucket body 1, the pipe valve b16 is located above the dirty water cavity b20, the dirty water cavity b20 is used to contain dirty water generated after cleaning, a water baffle b21 is disposed between the dirty water cavity b20 and the cleaning cavity b5, a guide tube b22 is disposed in the bucket body 1, one end of the guide tube b22 is connected to the cleaning cavity b5, and the other end of the guide tube b22 is connected to the dirty water cavity b20. The water baffle b21 separates the dirty water cavity b20 from the cleaning cavity b5, and dirty water generated after cleaning flows into the dirty water cavity b20 through the guide tube b22, so that dirty water and clean water are separated, thus avoiding secondary pollution. The water outlet of the washing pipe b9 is located above the water removal member 4 and is oblique. The water outlet of the washing pipe b9 is located above the water removal member 4 and is oblique, so that clean water can automatically flow onto the wiping object during washing, the positional layout is reasonable, and the washing effect is good. A plurality of turning ribs b23 which are symmetrical with respect to the center line of the water removal member 4 are disposed on the water removal member 4 and are used to turn the wiping object during cleaning, so that the wiping object can be cleaned comprehensively and completely. A plurality of drainage channels b24 are formed in the turning ribs b23, and the drainage channels b24 are sloped, so that dirty water can flow out through the drainage channels b24 during cleaning, and will not accumulated in the turning ribs b23, which may otherwise compromising the wiping effect and affecting next cleaning.

Embodiment 2

This embodiment is basically identical with in Embodiment 1 in structure and operating principle, and differs from Embodiment 1 in the following aspects: as shown in FIG. 3 and FIG. 4, the driving mechanism b3 comprises a rotary pedal b11 disposed on the bucket body 1, and the rotary pedal b11 is in drive fit with the water removal member 4 through a gear. The rotary pedal b11 may be rotated to drive the water removal member 4 to rotate. The water removal member 4 is driven manually, thus being environmentally friendly and saving energy.

Embodiment 3

Figure 5:
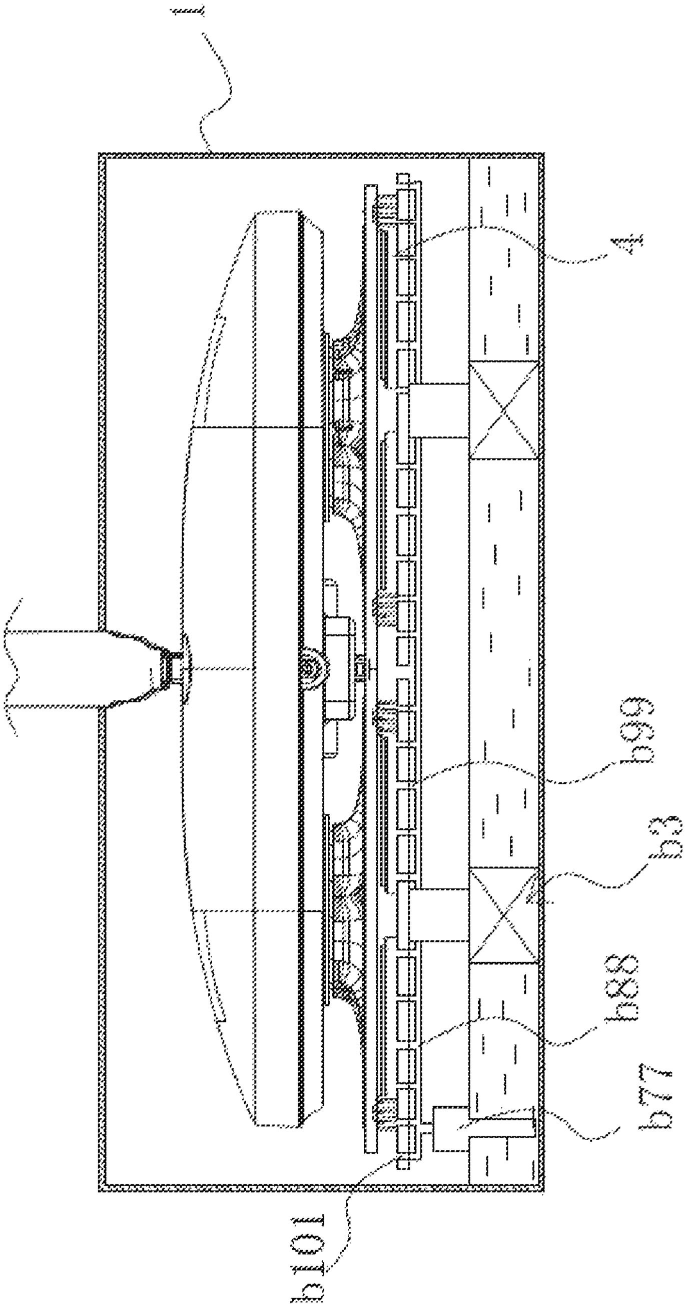
FIG. 5 is a schematic diagram of Embodiment 3.

This embodiment is basically identical with Embodiment 1 in structure and operating principle, and differs from Embodiment 1 in the following aspects: as shown in FIG. 5, the water conveying mechanism b4 comprises a water pump b77 disposed in the bucket body 1, a washing plate b88 is also disposed in the bucket body 1, one end of the water pump b77 contacts with a water surface, and the other end of the water pump b77 is connected to the washing plate b88.

In this embodiment, when the water pump b77 is used to pump water, water pumped by the water pump b77 enters the washing plate b88, and the washing plate b88 corresponds to the water removal member 4 in position, so that clean water flows to a desired position.

A plurality of discharge channels b99 are formed in the washing plate b88 and correspond to the water removal member 4 in position. A plurality of water outlets b101 are formed in the washing plate b88 and correspond to the discharge channels b99 in position.

Clean water entering the washing plate b88 washes the to-be-cleaned wiping object on the water removal member 4 in all directions through the discharge channels b99, the water outlets b101 enlarge the washing area to ensure that the edges of the wiping object are also sufficiently washed, and washing dead corners are further avoided, so that all positions of the wiping object can be washed.

Embodiment 4

Figure 6:
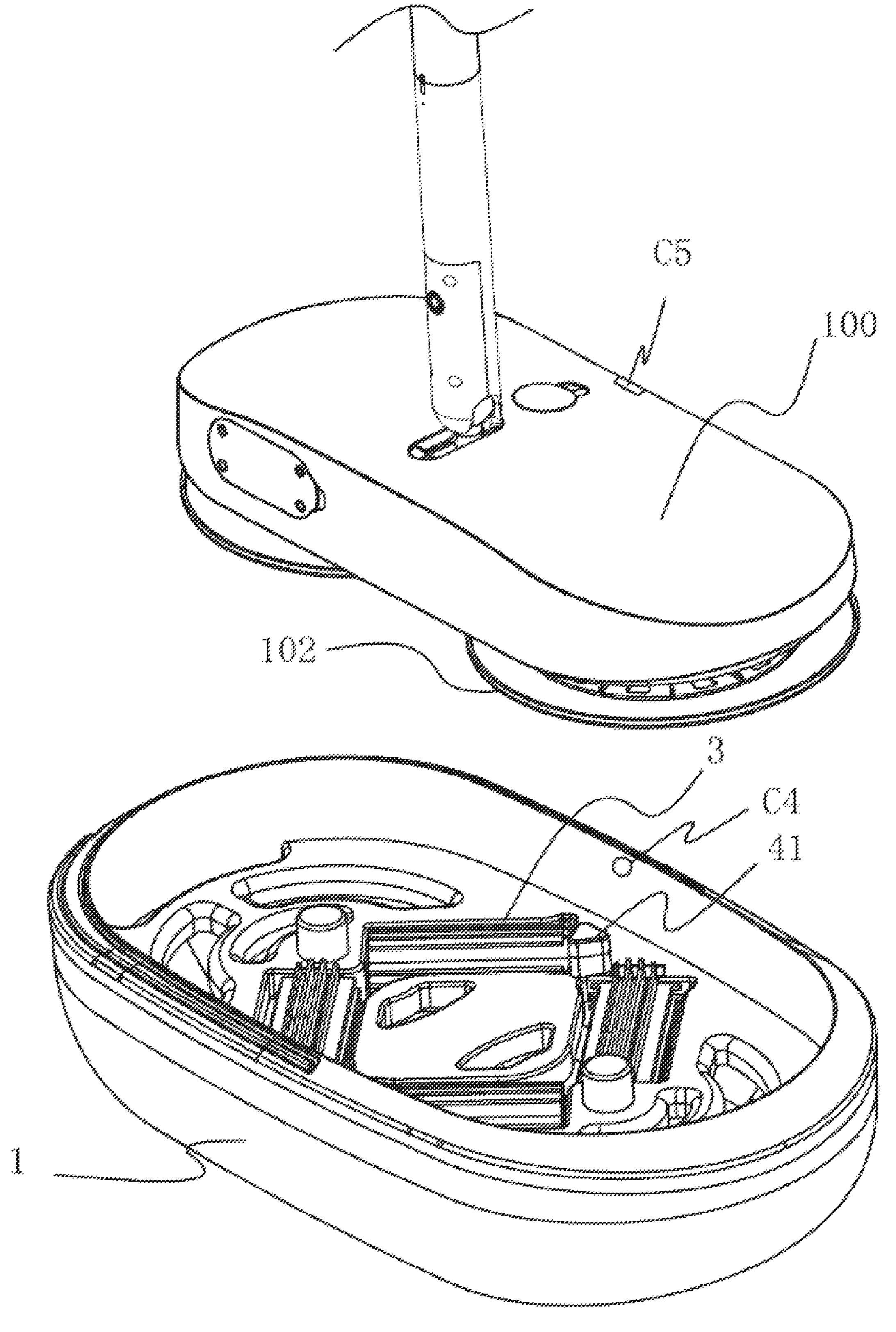
FIG. 6 is a structural view of Embodiment 4.
Figure 7:
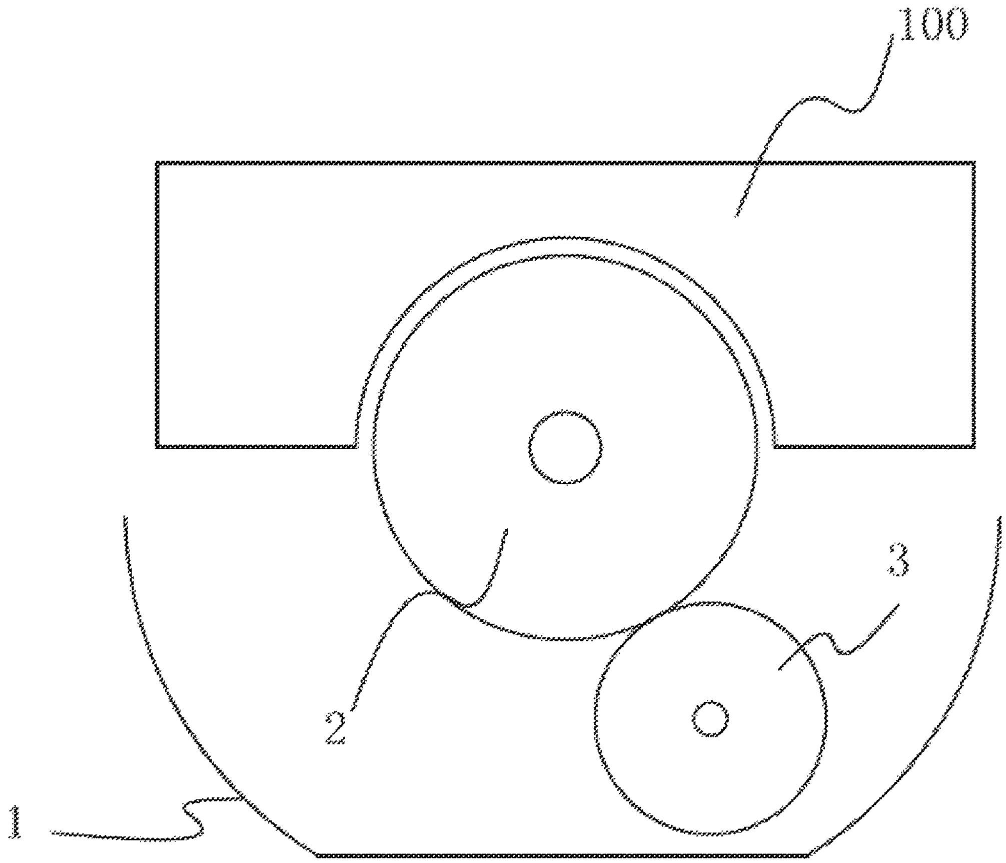
FIG. 7 is a structural view of a wiping object capable of rolling in Embodiment 4.
Figure 8:
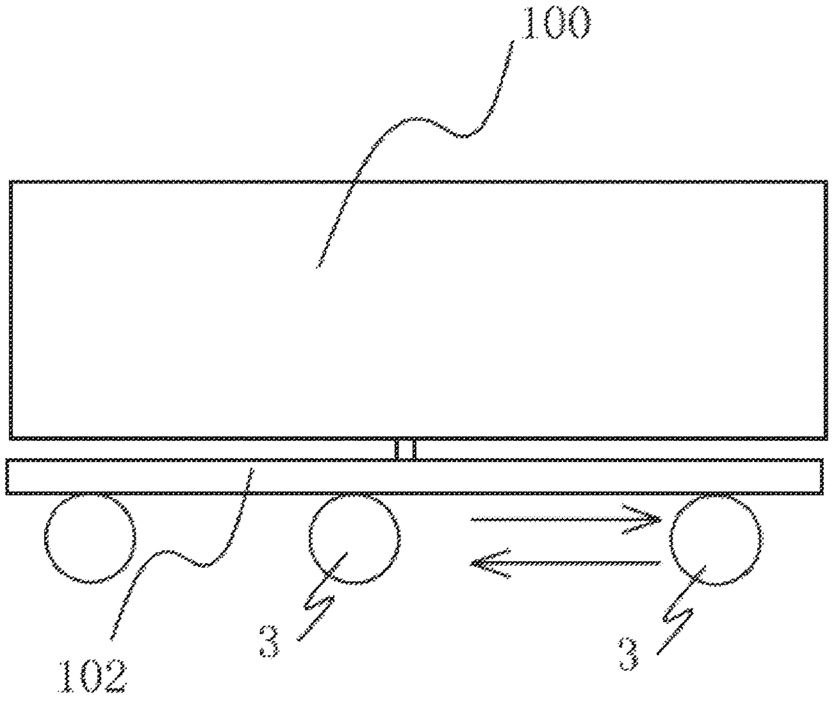
FIG. 8 is a structural view of a wiping object capable of reciprocating horizontally in Embodiment 4.
Figure 9:
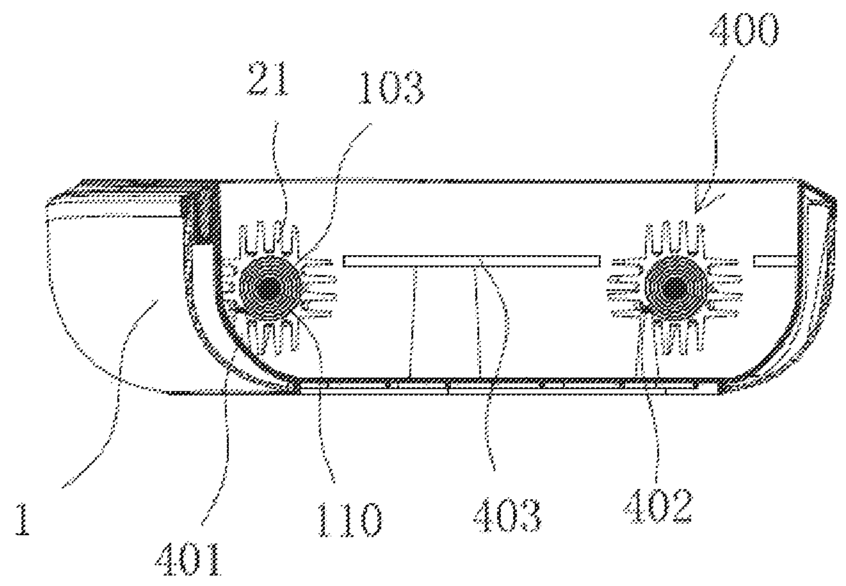
FIG. 9 is an internal structural view of Embodiment 5 when coil springs are in a released state.
Figure 10:
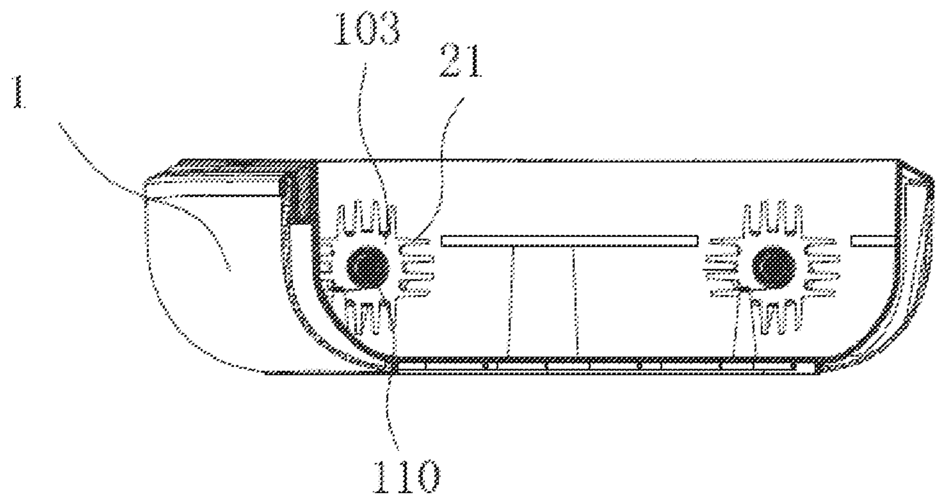
FIG. 10 is an internal structural view of Embodiment 5 when the coil springs are in a tightened state.
Figure 11:
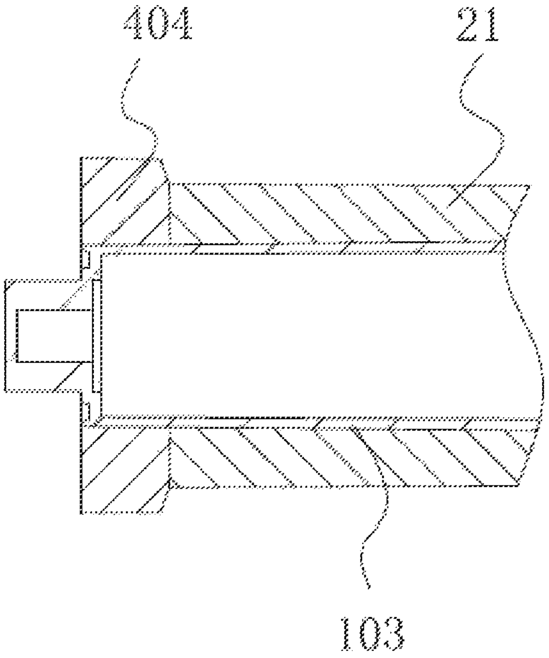
FIG. 11 is a partial structural view of a roller in Embodiment 5.
Figure 12:
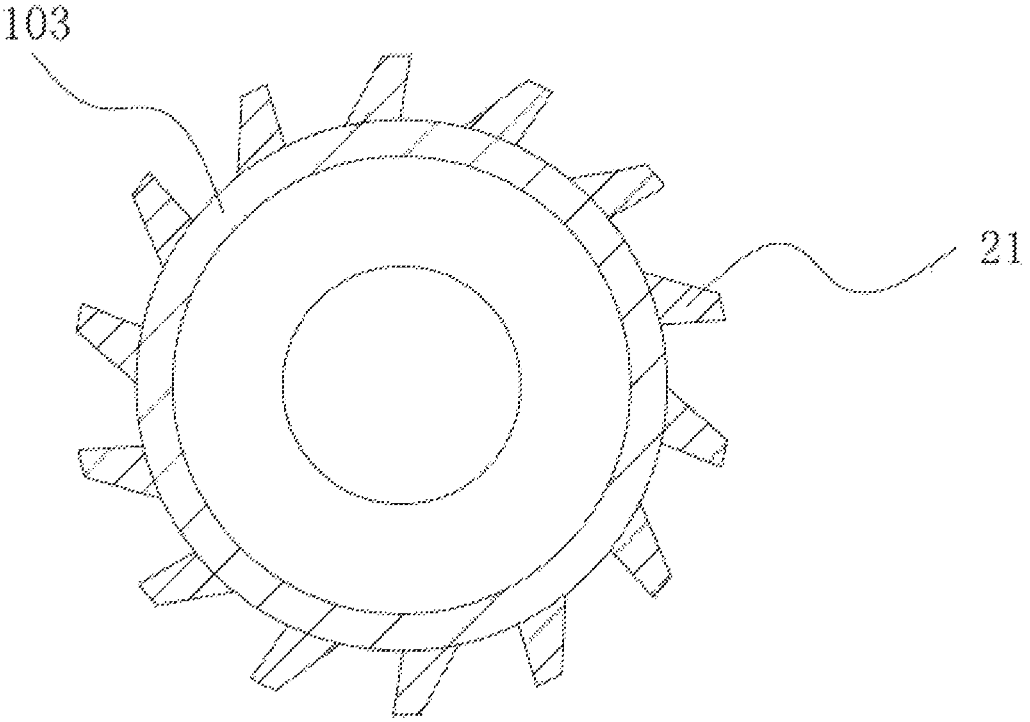
FIG. 12 is a sectional view of the roller in Embodiment 5.
Figure 13:
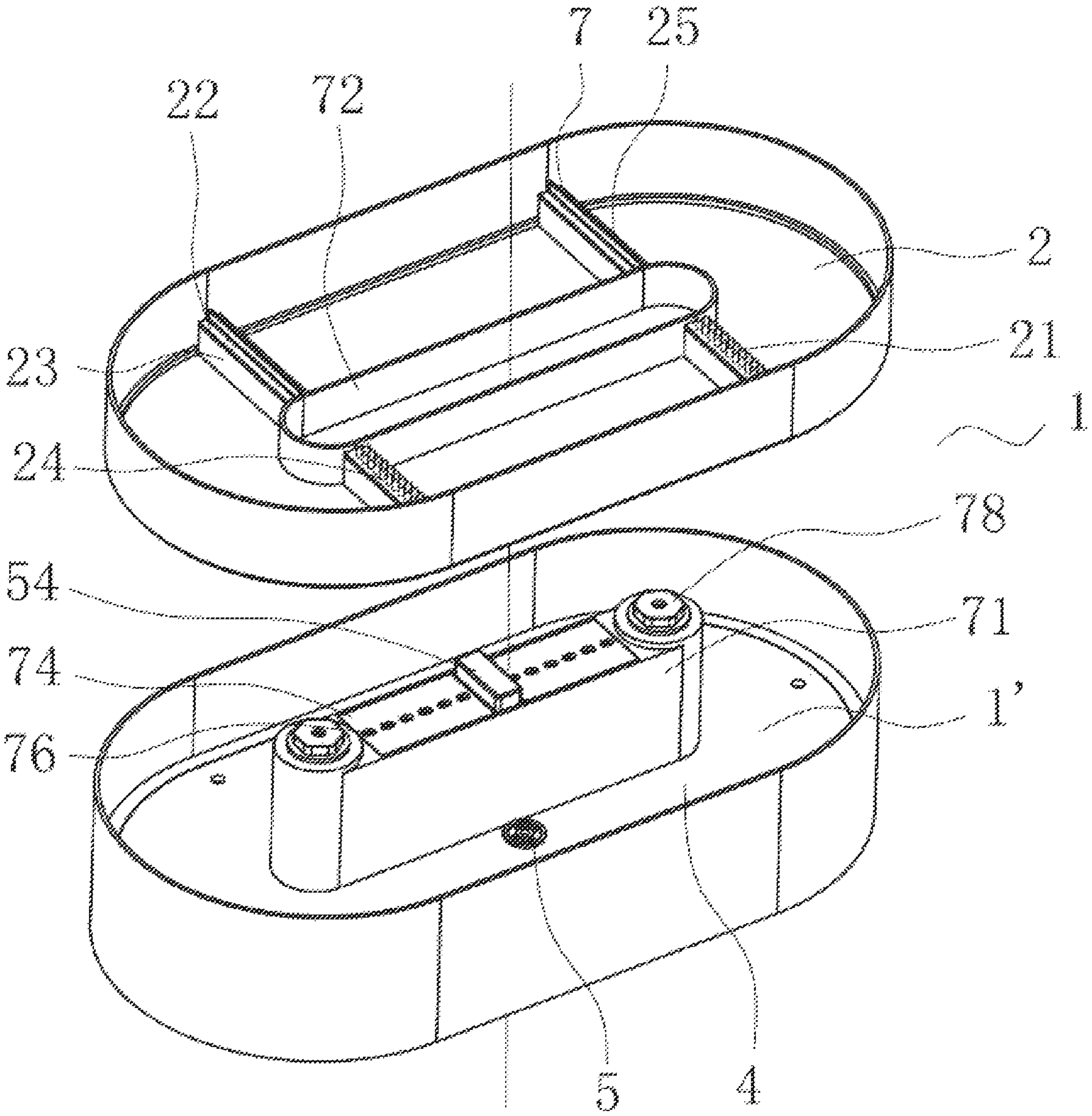
FIG. 13 is an expanded view of Embodiment 6.
Figure 14:
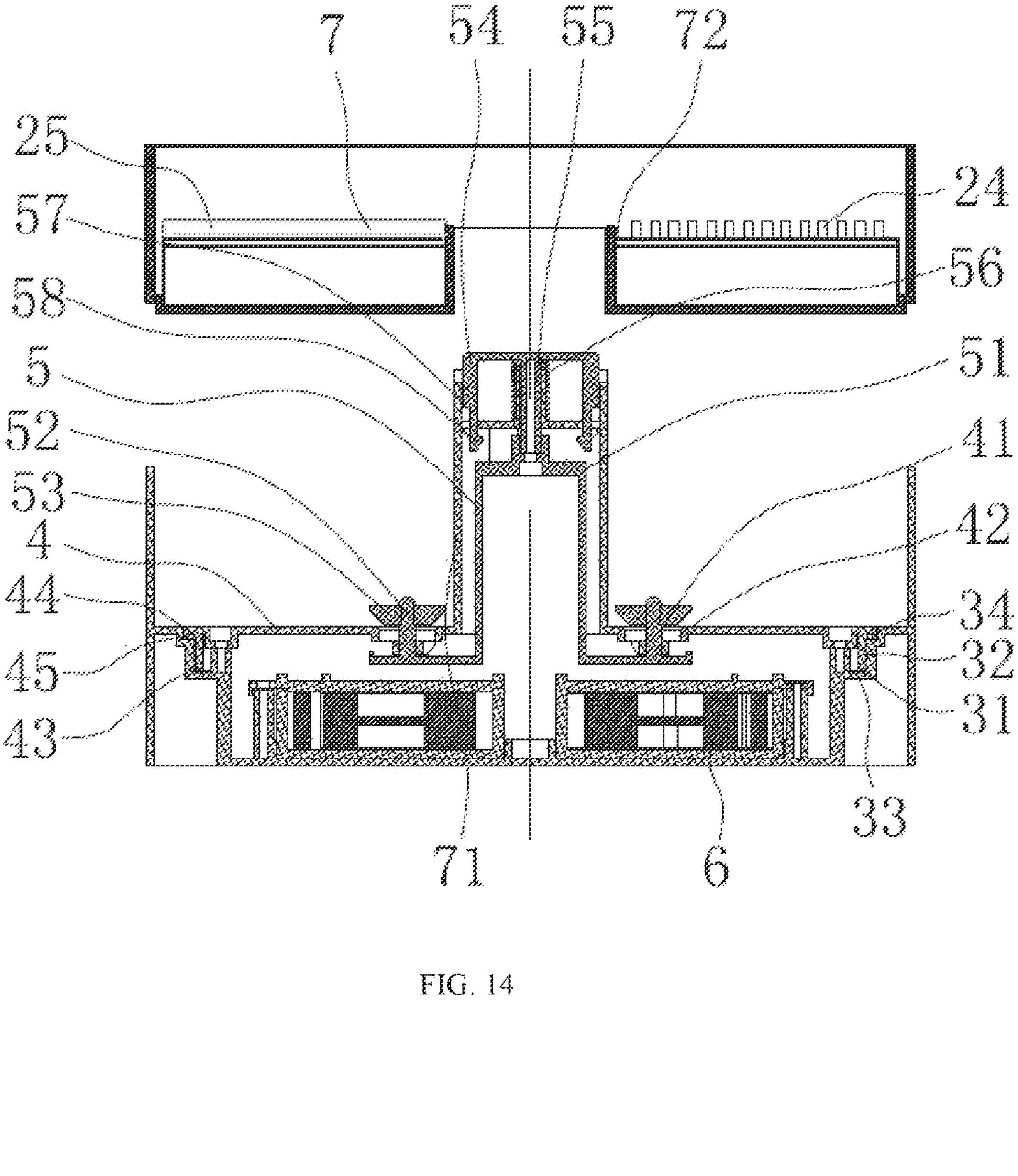
FIG. 14 is a sectional view of FIG. 13.
Figure 15:
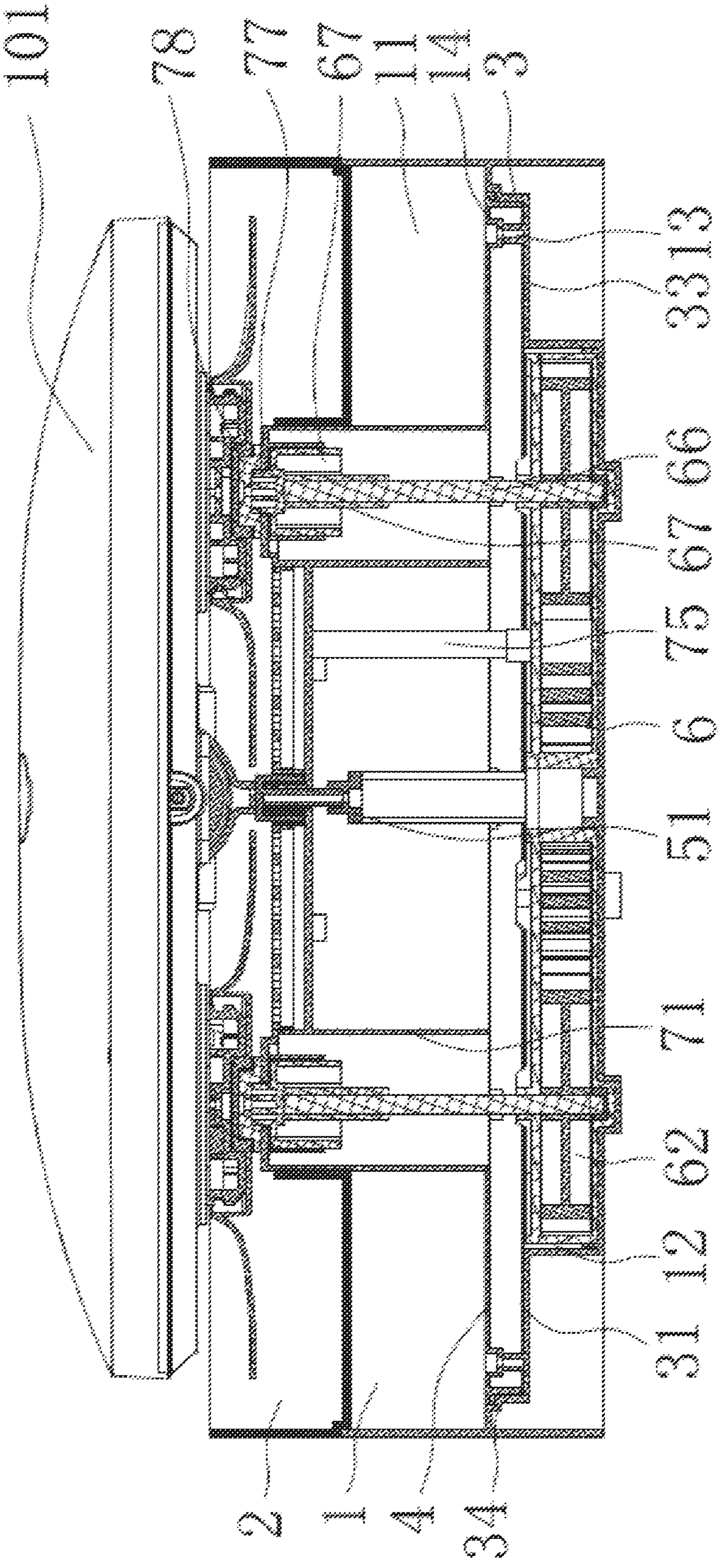
FIG. 15 is a sectional view of Embodiment 6 during work.
Figure 16:
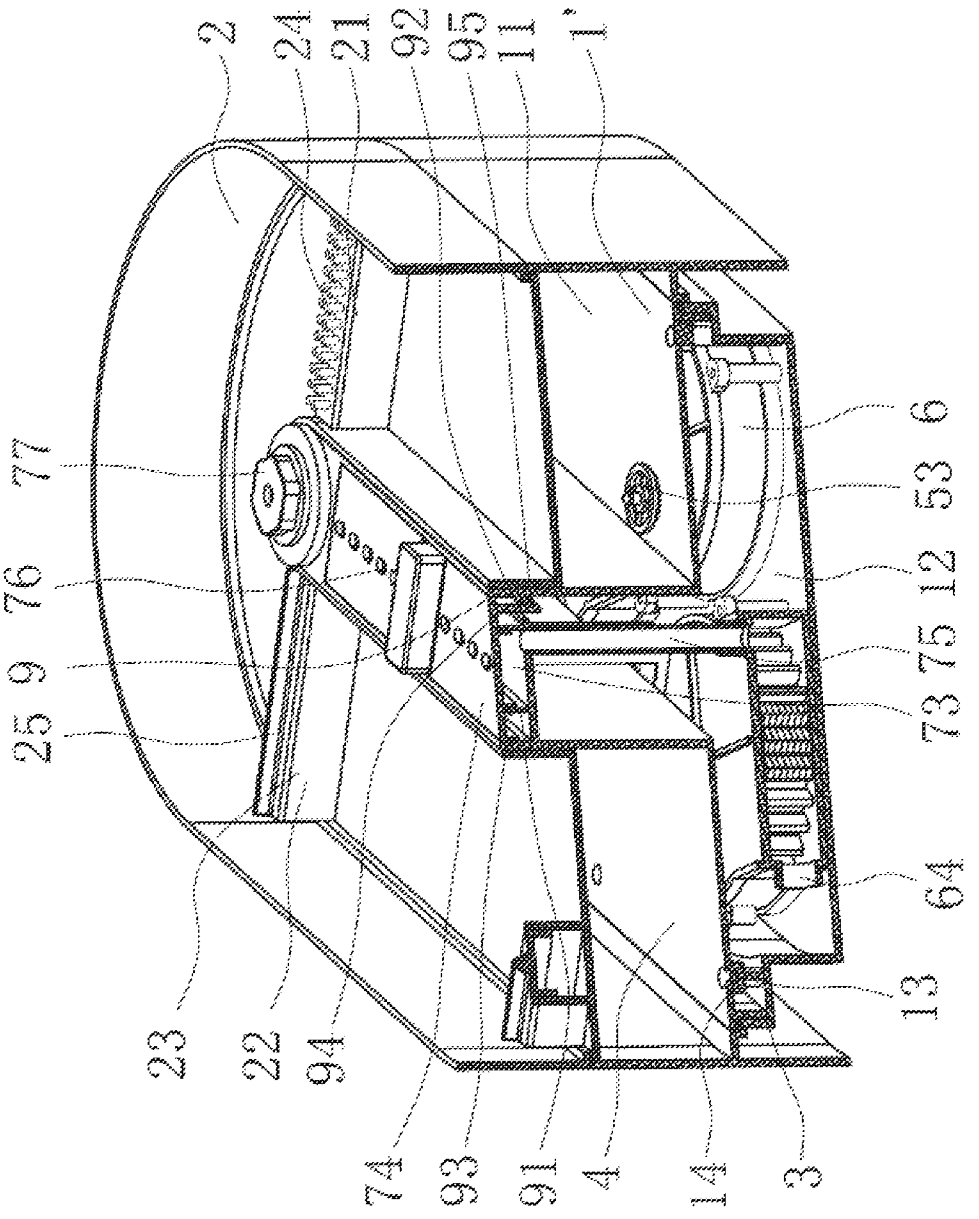
FIG. 16 is a structural view of the cross section of Embodiment 6.
Figure 17:
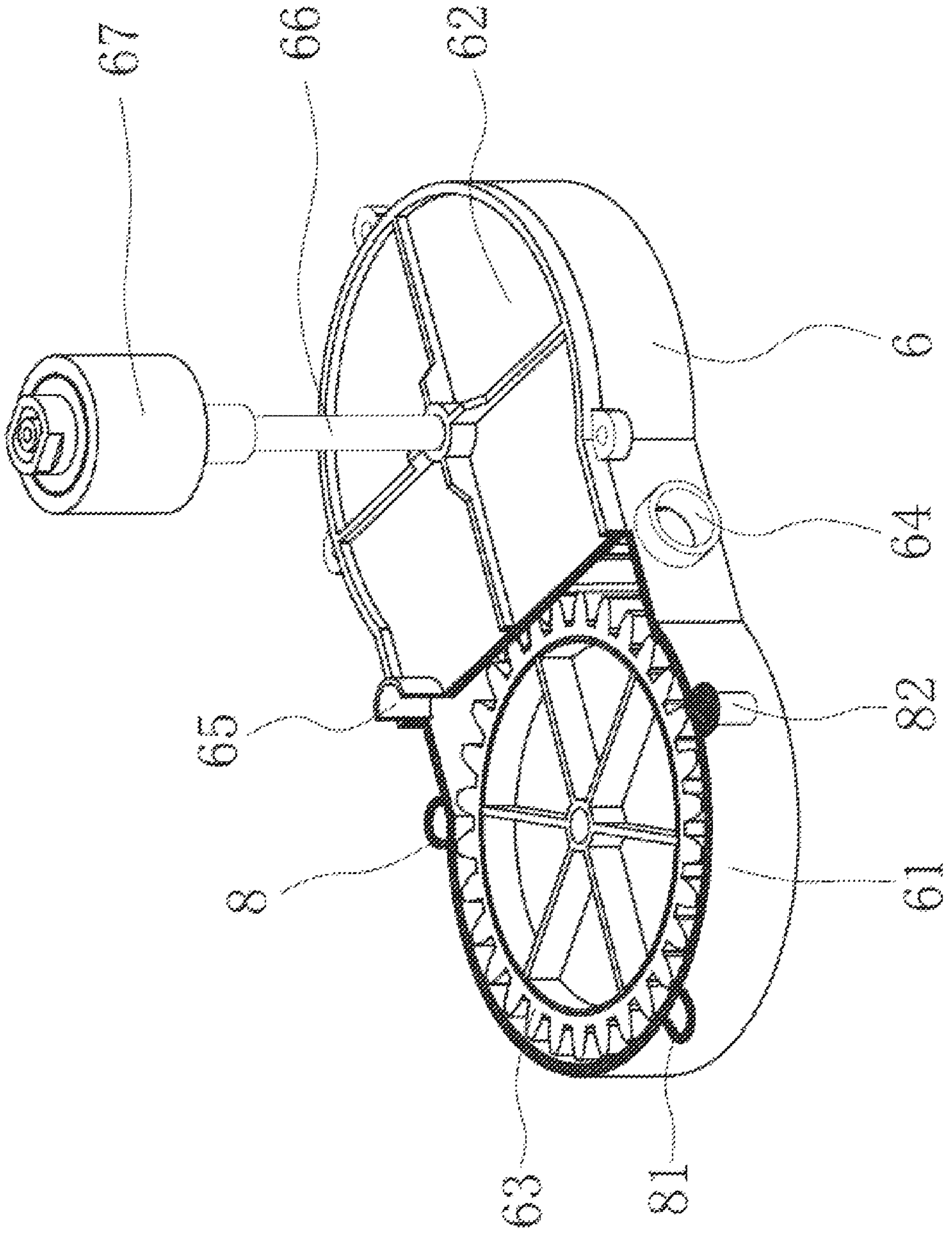
FIG. 17 is a structural view of a pump assembly in Embodiment 6.
Figure 18:
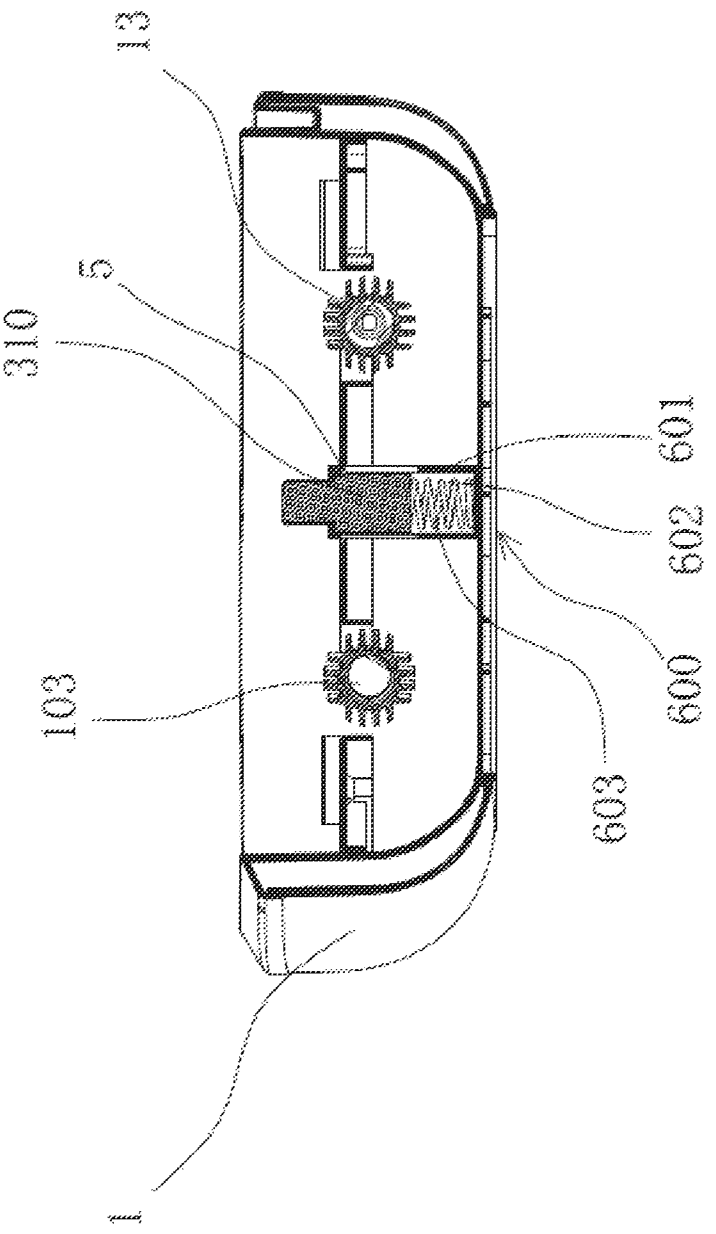
FIG. 18 is an overall structural view of Embodiment 7 when strips at the top of a wheel are higher than a support seat.
Figure 19:
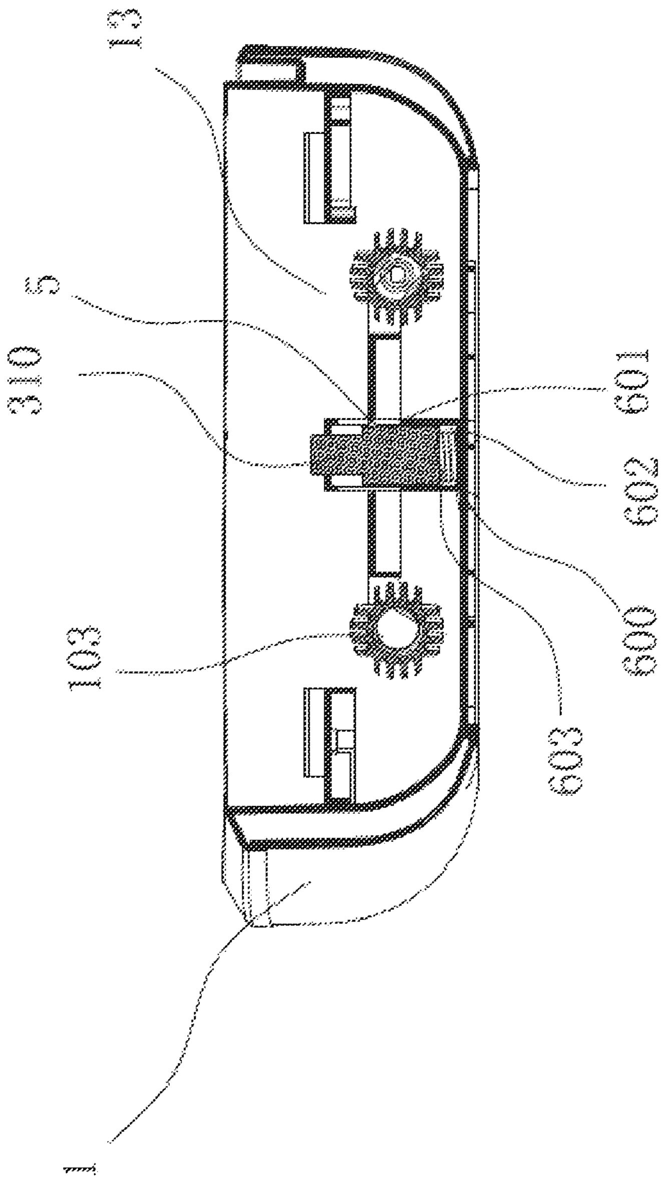
FIG. 19 is a structural view of Embodiment 7 when the strips at the top of the wheel are lower than the support seat.

As shown in FIG. 6 to FIG. 8, in this embodiment, a floor mopping machine comprises a shell 100, and a wiping object 102 is movably disposed below the shell 100 and is mounted on a wiping plate. The wiping object 102 is arranged movably with respect to the shell 100, that is, the wiping object 102 is able to rotate circumferentially, roll or reciprocate horizontally. Generally, the wiping plate is driven by a motor to drive the wiping object 102 to move, or the wiping plate is manually driven to drive the wiping object 102 to move. In this embodiment, the floor mopping machine further comprises a roller 3 in contact with the wiping object 102. When the floor mopping machine is used for cleaning, the roller 2 is separated from the wiping object 102. During cleaning, the roller 2 contacts with water and then rolls to carry water to the wiping object 102. During water removal, the roller 3 stops rolling, the wiping object 102 rubs against the roller 3, so that water on the wiping object 102 is removed. So, users need to control the water level properly to ensure that the roller 3 is neither completely immersed in water nor separated from water. If the roller 3 does not contact with water, water will not be supplied for cleaning. If the roller 3 is immersed in water, water on the wiping object 102 will not be removed later. After the water level is properly controlled, the wiping object 102 is placed above the roller 3, and then the roller 3 rotates to supply water to clean the wiping object 102. After the wiping object 102 is cleaned with water, the roller 3 is kept static, and the wiping object 102 rubs against the roller 3 to remove water. In this embodiment, the roller 3 may be locked with a pin to be kept static, or is prevented from rolling by a barrier, or is locked through a brake structure, and other common techniques in the prior art may also be adopted to keep the roller 3 static. In this embodiment, the roller supplies water to clean the wiping object in a rotating state, and rubs against the wiping object to remove water on the wiping object in a static state, and the position of the roller does not need to be changed when used for cleaning and water removal, so that operation is easy.

Preferably, the roller 3 is able to roll unidirectionally, that is, the roller 3 can roll clockwise or anticlockwise, and cannot roll reversely. When water is supplied to clean the wiping object 102, the wiping object 102 moves forward to drive the roller 3 to roll, so that water is supplied to the wiping object 102; and during water removal, the wiping object 102 moves reversely, the roller 3 cannot roll reversely and is kept static, and at this moment, the wiping object 102 rubs against the roller 2, so that water on the wiping object 102 is removed. In this embodiment, a ratchet mechanism may be used to realize unidirectional rolling of the roller 3, and the ratchet mechanism in the prior art is a unidirectional intermittent movement mechanism formed by a ratchet wheel and a pawl. In this embodiment, a ratchet wheel is disposed on the roller 3, a pawl is rotatably connected to a bucket body, and when the pawl abuts against the ratchet wheel, the roller 3 starts to roll unidirectionally. In this embodiment, the roller rolls unidirectionally, and is driven to roll when the wiping plate moves, so when the wiping object is cleaned, users can supply water to clean the wiping object or remove water on the wiping object merely by controlling the movement of the wiping plate, and cleaning and water removal may be synchronized accurately.

Preferably, the floor mopping machine further comprises a bucket body, and the roller 3 is disposed in the bucket body and is able to roll in the bucket body. The bucket body is used to contain water, and the roller 3 may be moved together with the bucket body, so that transfer is easy.

In this embodiment, the bucket body 1 is provided with a first detection element 4, the floor mopping machine is provided with a second detection element C5, and the first detection element C4 interacts with the second detection element C5 to generate instructions. The floor mopping machine may be placed in the bucket body 1 in two different directions. Because the floor mopping machine may be placed in the bucket body 1 in two different directions, two different instructions may be generated by the interaction of the first detection element C4 and the second detection element C5.

In this embodiment, a single chip microcomputer is disposed in the floor mopping machine. The single chip microcomputer determines the position of the floor mopping machine according to an instruction received, and takes, after analyzing the instruction received, corresponding control, such as triggering an alarm to remind an operator to make a correction; or, the single chip microcomputer selects a corresponding control mode according to an input instruction. Specifically:

In this embodiment, when the floor mopping machine is placed in the bucket body 1 in an incorrect direction, the first detection element C4 and the second detection element C5 interact to give a warning. The operator corrects the direction in which the floor mopping machine is placed in the bucket body 1 according to the warning, to ensure that the wiping object 102 of the floor mopping machine is cleaned with water first and then water on the wiping object 102 is removed.

In this embodiment, the floor mopping machine selects a control mode suitable for cleaning the wiping object 102 according to two different instructions. One control mode is that the wiping object 102 moves forward first and then moves reversely, and the other control mode is that the wiping object 102 moves reversely first and then moves forward. The wiping object 102 should be cleaned with water before water removal, and the roller 3 rolls unidirectionally, so the wiping object 102 should move first in a direction allowing the roller 3 to roll and then move reversely to make the roller 3 static, so as to meet the requirement for cleaning before water removal. In this embodiment, the wiping object can be cleaned with water before water removal no matter in which direction the floor mopping machine is placed in the bucket body by an operator, and no correction needs to be made by the operator.

In this embodiment, two different instructions may be generated according to different directions in which the floor mopping machine is placed in the bucket body. Specifically, when the floor mopping machine is placed in the bucket body, the first detection element C4 and the second detection element C5 interact to generate a first instruction which corresponds to the control mode that the wiping object moves forward first and then moves reversely, or a second instruction which corresponds to the control mode that the wiping object moves reversely first and then moves forward. In this way, the floor mopping machine does not need to be reversed manually, operation is easy, an error is avoided, and the wiping object may be cleaned strictly according to the cleaning requirement.

In this embodiment, the first detection element C4 and the second detection element C5 may be common technical means in the prior art, or be specifically implemented as follows:

In this embodiment, the first detection element C4 is a permanent magnet, and the second detection element C5 is a Hall switch or a reed switch; or, the position of the first detection element C4 and the position of the second detection element C5 are exchanged. The permanent magnet is able to trigger the Hall switch or the reed switch, the distance and direction between the permanent magnet and the Hall switch or the reed switch vary according to different positions of the floor mopping machine in the bucket body, different instructions will be generated by the interaction of the permanent magnet and the Hall switch or the reed switch, and the single chip microcomputer in the floor mopping machine determines the position of the floor mopping machine in the bucket body according to an instruction received.

As another preferred implementation, in this embodiment, the first detection element C4 and the second detection element C5 are both permanent magnets. The distance and direction between the two permanent magnets vary according to different positions of the floor mopping machine in the bucket body, and different instructions will be generated by the interaction of the two permanent magnets.

As another preferred implementation, the first detection element C4 is a microswitch, and the second detection element C5 is a trigger for triggering the microswitch. According to different positions of the floor mopping machine in the bucket body, the trigger triggers the microswitch or does not trigger the microswitch, so two instructions are generated.

As another preferred implementation, the first detection elements C4 and the second detection element C5 are a cavity and a protrusion 41 to be inserted into the cavity respectively. Preferably, the cavity is formed in the floor mopping machine, and the protrusion 41 is disposed on the bucket body. According to different positions of the floor mopping machine in the bucket body, the protrusion 41 is inserted into the cavity or is not inserted into the cavity and jacks the floor mopping machine. When the protrusion 41 is inserted into the cavity, the floor mopping machine can be placed in the bucket body smoothly. When the cavity mismatches the protrusion 41, the floor mopping machine cannot be placed in the bucket body smoothly due to the interference of the protrusion 41. So, two instructions are generated. The operator obtains the positional information of the floor mopping machine according to the two instructions.

Embodiment 5

As shown in FIG. 9-FIG. 12, in this embodiment, a floor mopping machine is provided with a wiping object for wiping the floor, a roller 103 is disposed in a bucket body 1 and is provided with a plurality of strips 21, the roller 103 is rotatably connected to the bucket body 1, and the roller 103 is connected to a stop mechanism 400 for stopping the roller 103 from rotating when the roller 103 continuously rotates in one direction.

During cleaning, the roller 103 rotates in one direction and conveys water to the wiping object through the strips 21;

During water removal, the stop mechanism 400 stops the roller 103 from rotating to stop conveying water to the wiping object through the strips 21.

The floor mopping machine is inserted into the bucket body 1, the wiping object capable of rotating circumferentially is connected to the bottom of the floor mopping machine, and the wiping object corresponds to the strips 21.

In this embodiment, the roller 103 is rotated to convey cleaning water in the bucket body to the wiping object, the structure is simple, the cost is low, the weight is low, and using is convenient; when the roller continuously rotates in one direction, the stop mechanism 400 may stop the roller from rotating to stop conveying water to the wiping object through the strips, so that water on the wiping object may be removed.

The floor mopping machine is inserted into the bucket body 1, and the wiping object corresponds to the strips 21. When the wiping object rotates clockwise in the circumferential direction, the roller 103 is driven to rotate to convey cleaning water onto the wiping object from the bottom of the bucket body 1 through the strips 21, so as to clean the wiping object. After the roller 103 rotates by several circles, the stop mechanism 400 stops the roller 103 from rotating to stop conveying water to the wiping object, and the wiping object continues to rotate and is wiped by the strips 21 on the roller 103. When the wiping object stops rotating, the stop mechanism 400 drives the roller 103 to return to be used next time, so the roller 103 does not need to be returned manually.

According to the wiping object cleaning device, water can be automatically supplied by means of power of the wiping object, capable of rotating in the circumferential direction, of the floor mopping machine, so as to clean the wiping object automatically; after being cleaned, the wiping object can be wiped without other operations; and the cleaning device is simple in structure, easy to use and nor prone to damage.

The stop mechanism 400 comprises coil springs 110 connected to the roller 103, and ends, away from the roller 103, of the coil springs 110 are connected to the bucket body 1.

In this embodiment, as shown in FIG. 9-FIG. 12, the coil springs 103 are slowly tightened when the roller 103 starts to rotate, so as to supply water for cleaning; after the coil springs 103 are completely tightened, the roller 103 is fixed to remove water on the wiping object, and no other operations are needed, so that using is extremely convenient.

Those skilled in the art should understand that the stop mechanism 400 may be a pull rope. Preferably, the coil springs 103 are used as the stop mechanism in this embodiment.

A plurality of binding posts 401 in one-to-one correspondence with the coil springs 110 are disposed at the bottom of the bucket body 1, and clamping screws 402 are movably connected to tops of the binding posts 401.

In this embodiment, as shown in FIG. 1-FIG. 4, the coil springs 103 may be tightened or released through the binding posts 401 and the clamping screws 402, and installation is facilitated.

A support seat 403 is disposed in the bucket body 1.

In this embodiment, as shown in FIG. 9-FIG. 12, the support seat 403 is used to support the floor mopping machine to enable the wiping object better fit the roller 103; and when the roller 103 rotates, cleaning water is conveyed onto the wiping object through a water supply channel 405 to clean the wiping object.

The support seat 403 is higher than the surface of cleaning water at the bottom of the bucket body 1, and the bottom of the roller 103 is immersed in the cleaning water.

In this embodiment, as shown in FIG. 9-FIG. 12, the support seat 403 is higher than the surface of the cleaning water at the bottom of the bucket body 1, so that the wiping object is protected from being polluted by dirty water in the bucket body after being cleaned.

The strips 21 are obliquely disposed on the roller 103 and are distributed in a ring array around a center point of the roller 103, and the strips 21 located at the bottom of the roller 103 are immersed in the cleaning water.

In this embodiment, as shown in FIG. 9-FIG. 12, the strips 21 are obliquely disposed on the roller 103, so that the quantity of supplied water is increased, and the cleaning efficiency is improved; and the strips 21 at the bottom of the roller 103 are immersed in the cleaning water, so that clean water below the roller 103 can be conveyed onto the wiping object in the cleaning process.

A plurality of turning ribs 404 are disposed on the roller 103, the turning ribs 404 are distributed in a ring array around the center point of the roller 103 and are fixedly connected to the strips 21, each turning rib 404 corresponds to one strip 21, and the turning ribs 404 are oblique.

In this embodiment, as shown in FIG. 9-FIG. 12, the wiping object can be turned through the turning rib 404, so as to be cleaned comprehensively and completely; and the turning ribs 404 are oblique, so that clean water below the roller 103 can be conveyed to edges of the wiping object in the cleaning process.

An angle between the axis of the turning ribs 404 and the axis of the roller 103 is an obtuse angle, and is the same as an angle between the axis of the strips and the axis of the roller 103.

In this embodiment, as shown in FIG. 9-FIG. 12, the angle between the axis of the turning ribs 404 and the axis of the roller 103 is an obtuse angle, so that the quantity of supplied water is further increased; and the angle between the axis of the turning ribs 404 and the axis of the roller 103 is the same as the angle between the axis of the strips 21 and the axis of the roller 103, so that the turning ribs 404 and the strips 21 are located in the same plane, and the quantity of supplied water is maximized.

The working principle of the invention is as follows: the floor mopping machine is inserted into the bucket body 1, and the wiping object corresponds to the strips 21; when rotating in the circumferential direction, the wiping object rubs against the strips at the top of the roller, so that the roller 103 is driven to rotate in one direction; when the roller 103 rotates in one direction, cleaning water at the bottom of the bucket body 1 is conveyed onto the wiping object through the strips 21 at the bottom and lateral portions of the roller 103, so as to clean the wiping object; after the roller 103 rotates by several circles, the coil springs 110 stop the roller 103 from rotating to stop supplying water to the wiping object, and the wiping object continues to rotate, so that water on the wiping object is removed through the strips 21 on the roller 103; and when water on the wiping object is removed, the wiping object is separated from the roller 103, the coil springs 110 drive the roller 103 to return to be used next time, so the roller 103 does not need to be manually returned.

Embodiment 6

As shown in FIG. 13-FIG. 17, in this embodiment, the bucket body 1 comprises a clean water bucket 1' and a dirty water bucket 2 mounted above the clean water bucket 1', wherein a pump assembly 6 is mounted in the clean water bucket 1', and a water outlet of the pump assembly 6 is connected to a cleaning mechanism 7 disposed on the dirty water bucket 2. When an inlet plug assembly 5 is closed, clean water is contained in an outer bucket 11 of the clean water bucket 1'. During work, the inlet plug assembly 5 is opened, the clean water flows into an inner bucket 12 and is driven by the pump assembly 6 to wash a floor mopping machine 101, and dirty water flows into the dirty water bucket 2 above the clean water bucket 1'.

Specifically, the clean water bucket 1' comprises the outer bucket 11 and the inner bucket 12, wherein the outer bucket 11 is disposed above the inner bucket 12, a partition plate 4 is mounted between the outer bucket 11 and the inner bucket 12 through a sealing mechanism 3, the inlet plug assembly 5 for communicating the outer bucket 11 with the inner bucket 12 is disposed on the partition plate 4, and the pump assembly 6 is disposed in the inner bucket 12.

Further, the pump assembly 6 is a gear pump and comprises a pump body 61, a driving wheel 62 and a driven wheel 63 which are rotatably engaged with each other are disposed in the pump body 61, a water inlet 64 is formed in one side of the pump body 61, a water outlet 65 is formed in the top of the other side of the pump body 61, a drive shaft 66 is fixedly mounted at the center of the driving wheel 62, and a rotating head 67 is fixed at an upper end of the drive shaft 66. The driving wheel 62 in the pump assembly 6 drives the driven wheel 63 to rotate to push water entering the pump assembly 6 via the water inlet 64 into the water outlet 65, and then the water flows upwards under the action of pressure.

Further, the cleaning mechanism 7 comprises a cleaning stand 71 disposed in the middle of the partition plate 4, an upper end of the cleaning stand 71 is inserted into a cleaning trough 72 in the middle of the dirty water bucket 2, a collection cavity 73 is formed in the upper end of the cleaning stand 71, the top of the collection cavity 73 is sealed by a sealing plate 74, the bottom of the collection cavity 73 is communicated with the water outlet 65 of the pump body 61, a plurality of spray holes 76 are formed in the center of the sealing plate 74 in an axial direction, a through hole 77 for mounting the rotating head 67 is formed in the upper end of the cleaning stand 71, and a rotary clamp ring 78 connected to the rotating head 67 is disposed over the through hole 77. Clean water rushes into the collection cavity 73 under the action of the pump assembly 6 and is then evenly sprayed onto a wiping object of the floor mopping machine 101 via the spray holes 76.

More further, the cleaning mechanism 7 comprises a plurality of brushes 21 vertically mounted above the dirty water bucket 2, and a scraper 22, wherein the brushes 21 and the scraper 22 are disposed on two sides of the cleaning trough 72 respectively. Most dirt on the surface of the wiping object of the floor mopping machine 101 is removed by the brushes 21 first, and then redundant water on the surface of the wiping object is removed by the scraper 22.

In addition, the brushes 21 and the scraper 22 are provided with a mounting trough plate 23 disposed at the bottom of the dirty water bucket 2 lengthways, and the brushes 24 and/or the scraper 25 are clamped in the mounting trough plate 23. The brushes 24 and the scraper 25 are clamped in the mounting trough plate 23, and thus can be disassembled and changed.

Moreover, the sealing mechanism 3 comprises a sealing step 31 disposed on an upper edge of the inner bucket 12 and has a vertical sealing surface 32 arranged vertically and a horizontal sealing surface 33 arranged horizontally, the vertical sealing surface 32 is attached to a vertical partition plate 43 vertically disposed below the edge of the partition plate 4, a sealing edge 34 is disposed at an upper end of the vertical sealing surface 2 and is clamped on the edge of the partition plate 4, a sealing groove 44 is formed below the edge of the partition plate 4, is filled with sealing silica gel 45, and presses against the sealing edge 34, a plurality of fixing posts 13 are vertically arranged in the inner bucket 12, and step holes 14 corresponding to the fixing posts 13 are formed in the partition plate 4. The seal mechanism 3 ensures the airtightness of the inner bucket 12 and the edge of the partition plate 4. The step holes 14 and the fixing posts 13 are connected through bolts to press the partition plate 4 on the inner bucket 12.

The pump assembly 6 is fixed with respect to the clean water bucket 1 through a limit mechanism 8. The limit mechanism 8 comprises a plurality of limit rings 81 disposed on an upper edge of a side face of the pump body 61, and limit posts 82 inserted into the limit rings 91 in a one-to-one correspondence manner are vertically disposed below the partition plate 4. The limit posts 82 penetrate through the limit rings 81 to prevent the pump assembly 6 from shaking in the horizontal direction.

Obviously, the collection cavity 73 and the sealing plate 74 are connected through a locking mechanism 9. The locking mechanism 9 comprises a plurality of vertical strips 91 which extend in the axial direction and are arranged vertically, locking grooves 92 extending in the axial direction are formed in the bottom of the collection cavity 73, a plurality of locking strips 93 attached to the vertical strips 91 or an inner side of the collection cavity 73 are disposed below the sealing plate 74, a locking plate 94 to be inserted into the locking groove 92 is disposed below the sealing plate, and a locking buckle 95 to be buckled on a bottom surface of the locking groove 92 is disposed on a lateral portion of an end of the locking plate 94. The locking mechanism 9 seals the upper end of the collection cavity 73 through the sealing plate 74, so that the sealing plate 74 and the collection cavity 73 are connected more tightly.

Preferably, the inlet plug assembly 5 comprises opening and closing holes 41 formed in the partition plate 4 and injection holes 42 distributed around the opening and closing holes 41, a telescopic connecting piece 51 is disposed in the cleaning stand 71, telescopic posts 52 to be inserted into the opening and closing holes 41 are disposed on two sides of the telescopic connecting piece 51, the telescopic posts 52 stretch or retreat with respect to the partition plate 4 when the telescopic connecting piece 51 moves upwards or downwards, inlet plugs 53 corresponding to the injection holes 42 are fixed at upper ends of the telescopic posts 52, a press block 54 connected to the telescopic connecting piece 51 is disposed above the collection cavity 73, a telescopic shaft 55 having a lower end connected to the telescopic connecting piece 51 is disposed in the middle of the press block 54, the telescopic shaft 55 is sleeved with an elastic assembly 56 disposed in the collection cavity 73, press plates 57 penetrating through the bottom of the collection cavity 73 are disposed below two sides of the press block 54, and press buckles 58 buckled on the bottom surface of the collection cavity 73 are disposed at ends of the press plates 57. The inlet plug assembly 5 controls the outer bucket 11 and the inner bucket 12 to be communicated; when the press block 54 is pressed by the floor mopping machine, the telescopic connecting piece 51 drives the inlet plugs 53 to move downwards to seal the injection holes 42, so that water in the outer bucket 11 is prevented from being injected into the inner bucket 12, and thus, the quantity of cleaning water is controlled.

To sum up, the principle of this embodiment is as follows: the clean water bucket 1' is separated from the dirty water bucket 2, and the clean water bucket 1' is provided with the outer bucket 11 and the inner bucket 12 that may be controlled to be communicated; and generally, the outer bucket 11 is communicated with the inner bucket 12 to inject clean water into the inner bucket 12. During work, the outer bucket 11 and the inner bucket 12 are disconnected by the inlet plug assembly 5, the pump assembly 6 sprays water in the inner bucket 12 onto the wiping object, and dirty water generated after cleaning flows into the dirty water bucket 2. After cleaning, the floor mopping machine 101 is moved away, and water is allowed to be injected into the inner bucket 12 again through the inlet plug assembly 5 for next cleaning.

Embodiment 7

As shown in FIG. 18, FIG. 19, FIG. 23 and FIG. 24, in this embodiment, a water supply portion 13 and a wheel 103 capable of rising and falling with respect to a bucket body 1 are disposed in the bucket body 1, and the wheel 103 is rotatably connected to the bucket body 1 or is connected to a driving mechanism.

A wiping object of a floor mopping machine is placed in the bucket body 1; when the wheel 103 moves to the water supply portion 13, the wiping object of the floor mopping machine drives the wheel 103 to rotate to convey water to the wiping object of the floor mopping machine, so that the wiping object of the floor mopping machine is cleaned; or, the driving mechanism drives the wheel 103 to rotate to convey water to the wiping object of the floor mopping machine so as to clean the wiping object. In this way, water can be supplied without a water pump, so that the weight of the bucket body is reduced, and using is convenient.

Specifically, as shown in FIG. 18, FIG. 19, FIG. 23 and FIG. 24, the wheel 103 or the wheel 103 and the driving mechanism are connected to the bucket body 1 through a connecting rod structure 14 or a manual locking structure. The wheel 103 or the wheel 103 and the driving mechanism can lifted or lowered quickly through the connecting rod structure 14 or the manual locking structure with an external force, and the wheel 103 or the wheel 103 and the driving mechanism can be locked when moving to the water supply portion, so that water can be continuously supplied for cleaning.

Figure 23:
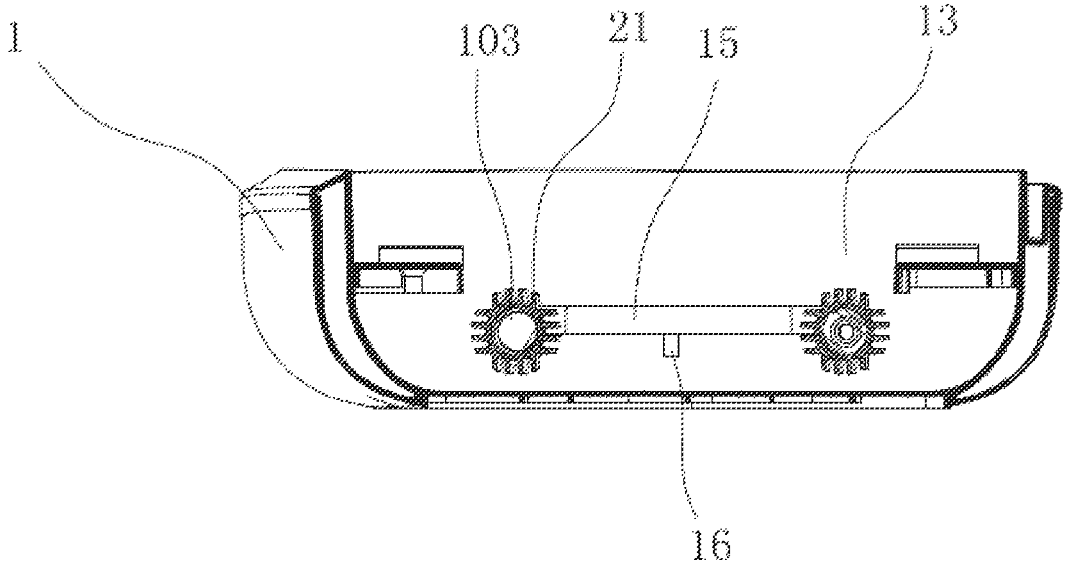
FIG. 23 is a structural view of Embodiment 7 when a connecting rod structure is adopted.
Figure 24:
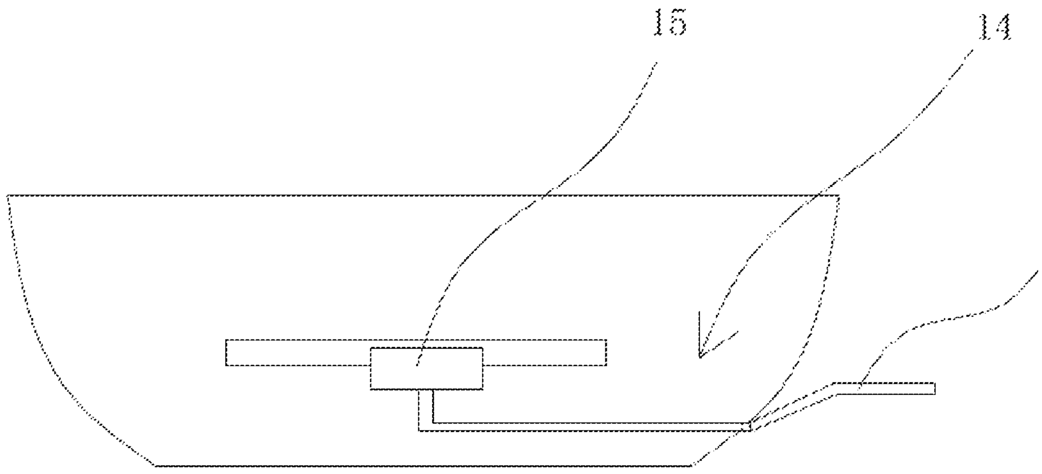
FIG. 24 is a structural diagram of the connecting rod structure in Embodiment 7.

Specifically, as shown in FIG. 23 and FIG. 24, the connecting rod structure 14 comprises a wheel carrier 15 and a lifting rod 16 connected to the wheel carrier 15 and extending out of the bucket body 1.

An end of the lifting rod 16 is hinged to the wheel carrier 15, the middle of the lifting rod 16 is hinged to the bucket body 1, and the wheel 103 or the wheel 103 and the driving mechanism can be lifted to the water supply portion by treading on an end, extending out of the bucket body, of the lifting rod 16.

The manual locking structure comprises a limit post 601 disposed outside the bucket body 1, a limit groove 602 is formed in the limit post 601, a button capable of rising and falling vertically is disposed in the limit groove 602 and is connected to the wheel 103, a locking mechanism 600 for locking or releasing the button 310 is disposed in the limit groove 602, a reset spring 603 is disposed at the bottom of the button 310, and an end, away from the button 310, of the reset spring 603 is disposed at the bottom of the limit groove 602.

Figure 20:
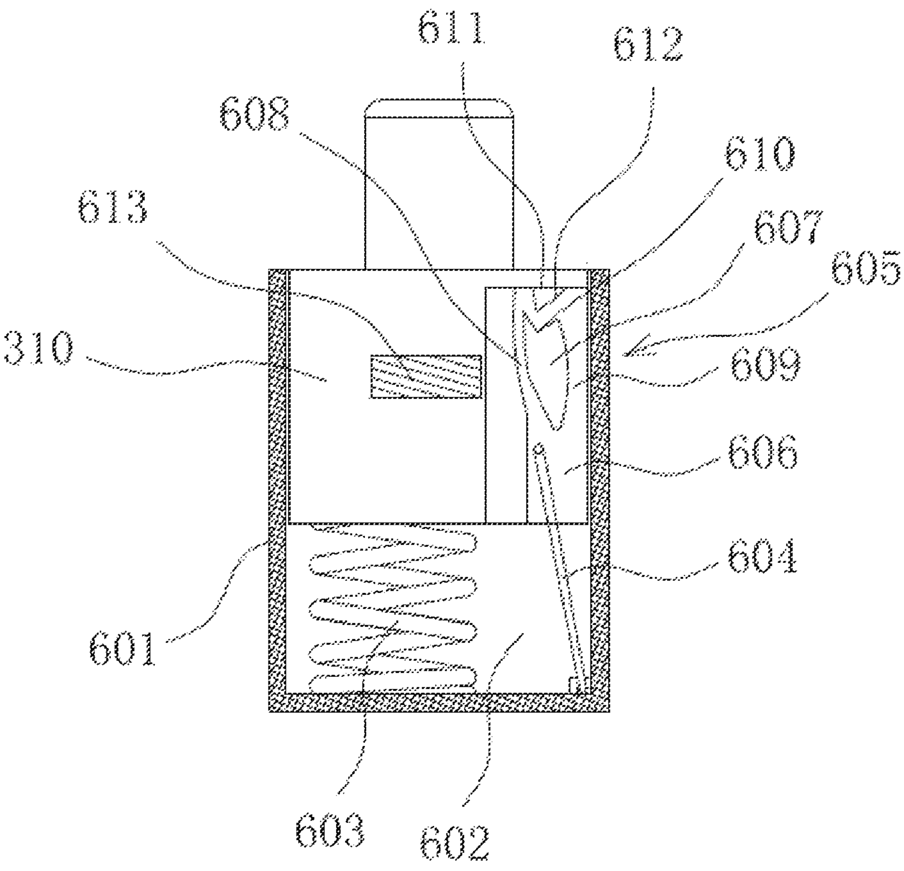
FIG. 20 is an enlarged view of a lock assembly in Embodiment 7.
Figure 21:
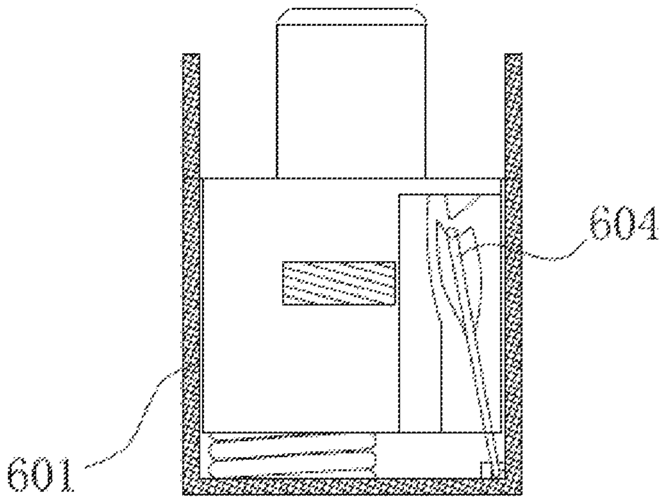
FIG. 21 is a structural view of the lock assembly in Embodiment 7 when a hook is located in an entry groove.
Figure 22:
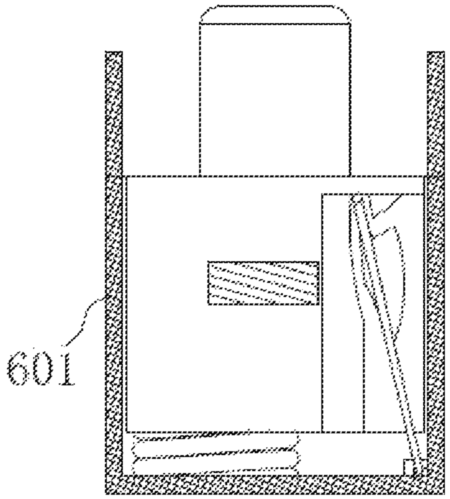
FIG. 22 is a structural view of the lock assembly in Embodiment 7 when the hook is located over a clamp groove.

In this embodiment, as shown in FIG. 20-FIG. 22, the button 310 may be limited in the limit groove 602 so as to be prevented from deviating in the movement process.

The floor mopping machine is inserted into the bucket body 1, and the button 310 is pressed downwards to drive the wheel to move downwards to be separated from the water supply portion; when pressed again, the button 310 is separated from the locking mechanism 600, and at this moment, the button 310 and the wheel move upward under the action of an elastic element to return to the water supply portion.

Those skilled in the art should understand that an elastic element such as a spring may be disposed at the bottom of the button, the button is pressed downward manually, and the button 310 is driven by the elastic piece to move upwards.

A reset spring 603 is disposed at the bottom of the button 310, and an end, away from the button 310, of the reset spring 603 presses against the bottom of the limit groove 602.

In this embodiment, as shown in FIG. 20-FIG. 22, the reset spring 603 is able to drive the button to move upwards to drive the wheel to move upwards, so the wheel can automatically return to the water supply portion when not locked.

The locking mechanism 600 comprises a rotatable hook 604 disposed at the bottom of the limit groove 602, the hook 604 is oblique and has an end being inserted into the button 310, and a lock assembly 605 corresponding to the hook 604 is disposed in the button 310.

In this embodiment, as shown in FIG. 20-FIG. 22, the hook 604 locks the button 310 together with the lock assembly 605 when the button 310 moves downwards to enable the wheel to be separated from the water supply portion.

The lock assembly 605 comprises a lock slot 606 formed in the button 310, and the hook 604 is inserted into the lock slot 606 and abuts against a side wall of the lock slot 606. A plug 607 is disposed in the lock slot 606, an entry slot 608 is formed in a left side of the plug 607, a clamping groove 610 is formed in the top of the plug 607, and an end of the hook 604 points to the entry slot 608.

In this embodiment, as shown in FIG. 20-FIG. 22, when the wheel moves to the water supply portion, the button 310 is pressed downwards, and the hook 604 slides into the entry slot 608 along the side wall of the lock slot 606; when the button 310 is released, the reset spring drives the button 310 to move upwards to enable the hook 604 to slide into the clamping groove 610, and the hook 604 is clamped in the clamping groove 610 to prevent the button 310 from returning and to maintain the button 310 at the bottom of the limit groove, so that the wheel is kept being separated from the water supply portion.

A disengaging groove 609 is formed in a right side of the plug 607, a disengaging block 611 is disposed at the top of the plug 607, and a disengaging step 612 is disposed at the bottom of the disengaging block 611.

In this embodiment, as shown in FIG. 20-FIG. 22, when the hook 604 is located in the clamping groove 610, the button 310 is pressed downwards to enable the disengaging block 611 to move downwards to be disengaged from the disengaging step 612 at the bottom of the disengaging block 611, so as to allow the hook 604 to slide into the disengaging groove 609; and when the button 310 is released, the reset spring drives the button 310 is move upwards, the hook 604 slides out of the disengaging groove 609, and at this moment, the button drives the wheel to move upwards to the water supply portion.

A locating slot 614 is formed in a side wall of the limit post 601, and a locating block 5 to be inserted into the locating slot 614 is disposed on the button 310.

In this embodiment, as shown in FIG. 20-FIG. 22, the locating block 5 and the locating groove 614 can limit the maximum upward moving distance of the button and can also limit the button in the circumferential direction to prevent the wheel from rotating in the circumferential direction.

In this embodiment, as shown in FIG. 20-FIG. 22, the elastic force of the reset spring 603 is greater than the weight of the button 310 and the wheel 103, and the wheel 103 is in running fit with the button 310 to ensure that the wheel can work normally.

The working principle of this embodiment is as follows: the wiping object of the floor mopping machine is placed in the bucket body 1; when the wheel 103 moves to the water supply portion 13, the wiping object of the floor mopping machine drives the wheel 103 to rotate to convey water to the wiping object of the floor mopping machine, so that the wiping object of the floor mopping machine is cleaned; or, the driving mechanism drives the wheel 103 to rotate to convey water to the wiping object of the floor mopping machine so as to clean the wiping object, and water is supplied without a water pump, so that the weight of the bucket body is reduced, and using is convenient; the wheel 103 or the wheel 103 and the driving mechanism can be lifted or lowered quickly through the connecting rod structure 14 or the manual locking structure with an external force, and the wheel 103 or the wheel 103 and the driving mechanism can be locked when moving to the water supply portion, so that water can be continuously supplied for cleaning.

When the connecting rod structure 14 is used, the end of the lifting rod 16 is hinged to the wheel carrier 15, and the middle of the lifting rod 16 is hinged to the bucket body 1; and the wheel 103 or the wheel 103 and the driving mechanism can be lifted the water supply portion by treading on the end, extending out of the bucket body, of the lifting rod 16.

When the manual locking structure is used, the button 310 is limited in the limit groove 602 to be prevented from deviating in the moving process; the floor mopping machine is inserted into the bucket body 1, and the button 310 is pressed downward to drive the wheel to move downwards to be separated from the water supply portion; when pressed again, the button 310 is separated from the locking mechanism 600, at this moment, the button 310 and the wheel move upwards under action of the elastic element and return to the water supply portion, and the reset spring 603 drives the button to move upwards so as to drive the wheel to move upwards, so that the wheel can automatically return to the water supply portion when not locked; when moving downwards to enable the wheel to be separated from the water supply portion, the button 310 can be locked through the hook 604 and the lock assembly 605; when the wheel moves to the water supply portion, the button 310 is pressed downwards, the hook 604 slides into the entry slot 608 along the side wall of the lock slot 606; when the button 310 is released, the reset spring drives the button 310 to move upwards to enable the hook 604 to slide into the clamping groove 610, and the hook 604 is clamped in the clamping groove 610 to prevent the button 310 from returning and maintain the button 310 at the bottom of the limit groove, so that the wheel is kept being separated from the water supply portion; when the hook 604 is located in the clamping groove 610, the button 310 is pressed downwards to enable the disengaging block 611 to move downwards to be disengaged from the disengaging step 612 at the bottom of the disengaging block 611, so that the hook 604 slides into the disengaging slot 609; when the button 310 is released, the reset spring drives the button 310 to move upwards, the hook 604 slides out of the disengaging groove 609, at this moment, the wheel is driven to move upwards to the water supply portion, and the locating block 5 cooperates with the locating groove 614 to limit the maximum upward moving distance of the button and limit the button in the circumferential direction to prevent to the wheel from rotating in the circumferential direction.

The specific embodiments described in this specification are merely used to explain the spirit of the invention by way of examples. Those skilled in the art may make various amendments, supplements or similar substitutions to these specific embodiments described above without departing from the spirit of the invention or exceeding the scope defined by the appended claims.

What is claimed is:

1. A wiping object cleaning device for a floor mopping machine, comprising:

a bucket body, and a water conveying mechanism for conveying water onto a wiping object of the floor mopping machine, wherein the water conveying mechanism comprises a unidirectional roller configured to be in contact with the wiping object, and a pump assembly or a washing pipe having a valve;

wherein during cleaning, the water conveying mechanism conveys water and the unidirectional roller contacts with water and the wiping object and rolls to convey water to the wiping object; and during water removal, the water conveying mechanism stops conveying water and the unidirectional roller keeps static, the wiping object rubs against the roller, so that water on the wiping object is removed.

2. The wiping object cleaning device for the floor mopping machine according to claim 1, wherein a water removal member and a driving mechanism for driving the water removal member to rotate with respect to the bucket body are disposed in the bucket body.

3. The wiping object cleaning device for the floor mopping machine according to claim 1, wherein the bucket body comprises a clean water bucket and a dirty water bucket mounted above the clean water bucket, and the water conveying mechanism is disposed in the clean water bucket.

4. The wiping object cleaning device for the floor mopping machine according to claim 3, wherein the clean water bucket comprises an outer bucket and an inner bucket, the outer bucket is disposed above the inner bucket, a partition plate is mounted between the outer bucket and the inner bucket through a sealing mechanism, an inlet plug assembly for communicating the outer bucket with the inner bucket is disposed on the partition plate, and the pump assembly is disposed in the inner bucket.

5. The wiping object cleaning device for the floor mopping machine according to claim 1, wherein a water supply portion and a wheel configured to rise and fall with respect to the bucket body are disposed in the bucket body, and the wheel is rotatably connected to the bucket body or is connected to a driving mechanism.

6. The wiping object cleaning device for the floor mopping machine according to claim 5, wherein the wheel or the wheel and the driving mechanism are connected to the bucket body through a connecting rod structure or a manual locking structure.

7. The wiping object cleaning device for the floor mopping machine according to claim 6, wherein the connecting rod structure comprises a wheel carrier and a lifting rod, wherein the lifting rod is connected to the wheel carrier and extends out of the bucket body.

8. The wiping object cleaning device for the floor mopping machine according to claim 6, wherein the manual locking structure comprises a limit post disposed in the bucket body, a limit groove is formed in the limit post, a button configured to rise and fall vertically is disposed in the limit groove, the button is connected to the wheel, a locking mechanism for locking or releasing the button is disposed in the limit groove, a reset spring is disposed at a bottom of the button, and an end of the reset spring presses against a bottom of the limit groove, wherein the end of the reset spring is away from the button.

9. The wiping object cleaning device for the floor mopping machine according to claim 1, further comprising a guide tube disposed in the bucket body, wherein one end of the guide tube is connected to a dirty water cavity and the other end is connected to a cleaning cavity.

10. A wiping object cleaning device for a floor mopping machine, comprising:

a bucket body, and a water conveying mechanism for conveying water to a wiping object of the floor mopping machine;

wherein during cleaning, the water conveying mechanism conveys water; and during water removal, the water conveying mechanism stops conveying water;

wherein the water conveying mechanism comprises a unidirectional roller in contact with the wiping object; during cleaning, the unidirectional roller contacts with water and rolls to convey water to the wiping object; and during water removal, the unidirectional roller keeps static, the wiping object rubs against the unidirectional roller, so that water on the wiping object is removed; and wherein the unidirectional roller is provided with a plurality of strips and the unidirectional roller is connected to a stop mechanism for stopping the unidirectional roller from rotating when the unidirectional roller continuously rotates in one direction;

during cleaning, the unidirectional roller rotates in one rotation direction and conveys water to the wiping object through the plurality of strips;

during water removal, the stop mechanism stops the unidirectional roller from rotating to stop conveying water to the wiping object through the plurality of stripes.

11. The wiping object cleaning device for the floor mopping machine according to claim 2, further comprising a plurality of discharge channels formed in a washing plate corresponding to a position of the water removal member.

12. The wiping object cleaning device for the floor mopping machine according to claim 2, further comprising a plurality of drainage channels formed in a plurality of turning ribs which are symmetrical with respect to a center of the water removal member.

13. The wiping cleaning device for the floor mopping machine according to claim 12, further comprising a guide tube disposed in the bucket body, wherein end of the guide tube is connected to a dirty water cavity and the other end is connected to a cleaning cavity.

14. The wiping cleaning device for the floor mopping machine according to claim 10, wherein the stop mechanism is a ratchet mechanism.

15. The wiping cleaning device for the floor mopping machine according to claim 14 wherein the ratchet mechanism is formed by a ratchet wheel disposed on the unidirectional roller and a pawl rotatably connected to the bucket body.

* * * * *